(12) United States Patent
Liu et al.

(10) Patent No.: US 11,398,892 B2
(45) Date of Patent: Jul. 26, 2022

(54) BANDWIDTH PART (BWP) HOPPING FOR INTERFERENCE MITIGATION

(71) Applicant: QUALCOMM INCORPORATED, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/948,094

(22) Filed: Sep. 2, 2020

(65) Prior Publication Data
US 2021/0075579 A1    Mar. 11, 2021

Related U.S. Application Data

(60) Provisional application No. 62/897,176, filed on Sep. 6, 2019.

(51) Int. Cl.
*H04W 24/08* (2009.01)
*H04L 5/00* (2006.01)
*H04B 1/7143* (2011.01)
*H04W 74/08* (2009.01)
*H04W 76/11* (2018.01)

(52) U.S. Cl.
CPC ......... *H04L 5/0092* (2013.01); *H04B 1/7143* (2013.01); *H04L 5/0055* (2013.01); *H04L 5/0098* (2013.01); *H04W 24/08* (2013.01); *H04W 74/0808* (2013.01); *H04W 76/11* (2018.02)

(58) Field of Classification Search
CPC ... H04B 1/7143; H04L 5/0044; H04L 5/0051; H04L 5/0055; H04L 5/0092; H04L 5/0098; H04W 24/08; H04W 72/042; H04W 72/0453
USPC ......................................... 370/252, 329, 331
See application file for complete search history.

(56) References Cited

U.S. PATENT DOCUMENTS

2019/0173521 A1    6/2019  Liu et al.
2019/0215807 A1*   7/2019  Hwang ............... H04W 72/042
(Continued)

OTHER PUBLICATIONS

International Search Report and Written Opinion—PCT/US2020/049218—ISA/EPO—dated Dec. 23, 2020.
(Continued)

*Primary Examiner* — Harun Chowdhury
(74) *Attorney, Agent, or Firm* — Haynes and Boone, LLP

(57) ABSTRACT

Wireless communications systems and methods related to bandwidth part (BWP) hopping for interference mitigation are provided. A user equipment (UE) receives, from a base station (BS), a bandwidth part (BWP) configuration indicating a first BWP hopping pattern in a plurality of frequency subbands within a shared radio frequency band. The UE monitors for a first communication signal in a first frequency subband of the plurality of frequency subbands. The UE performs BWP hopping from the first frequency subband to a second frequency subband of the plurality of frequency subbands based on the first BWP hopping pattern. The UE monitors, after performing the BWP hopping, for a second communication signal in the second frequency subband.

30 Claims, 16 Drawing Sheets

(56) References Cited

U.S. PATENT DOCUMENTS

| | | |
|---|---|---|
| 2019/0274162 A1 | 9/2019 | Zhang et al. |
| 2020/0145169 A1* | 5/2020 | Zhou .................... H04L 5/0055 |
| 2020/0259521 A1* | 8/2020 | Zhao .................... H04B 1/7143 |
| 2020/0403653 A1* | 12/2020 | Matsumura ........... H04L 5/0051 |
| 2021/0218502 A1* | 7/2021 | Park .................. H04W 72/0453 |
| 2021/0235496 A1* | 7/2021 | Park .................... H04L 5/0044 |

OTHER PUBLICATIONS

KT Corp: "Considerations on Frequency Hopping for PUCCH", 3GPP Draft, R1-1714475, 3GPP TSG RAN WG1 Meeting #90, 3rd Generation Partnership Project (3GPP), Mobile Competence Centre, 650, Route Des Lucioles, F-06921 Sophia-Antipolis Cedex, France vol. RAN WG1, No. Prague, Czechia, Aug. 21, 2017-Aug. 25, 2017, Aug. 20, 2017 (Aug. 20, 2017), XP051317252, 3 Pages, Retrieved from the Internet: URL:http://www.3gpp.org/ftp/Meetings_3GPP_SYNC/RAN1/Docs/ [retrieved on Aug. 20, 2017] Paragraph [0002].

* cited by examiner

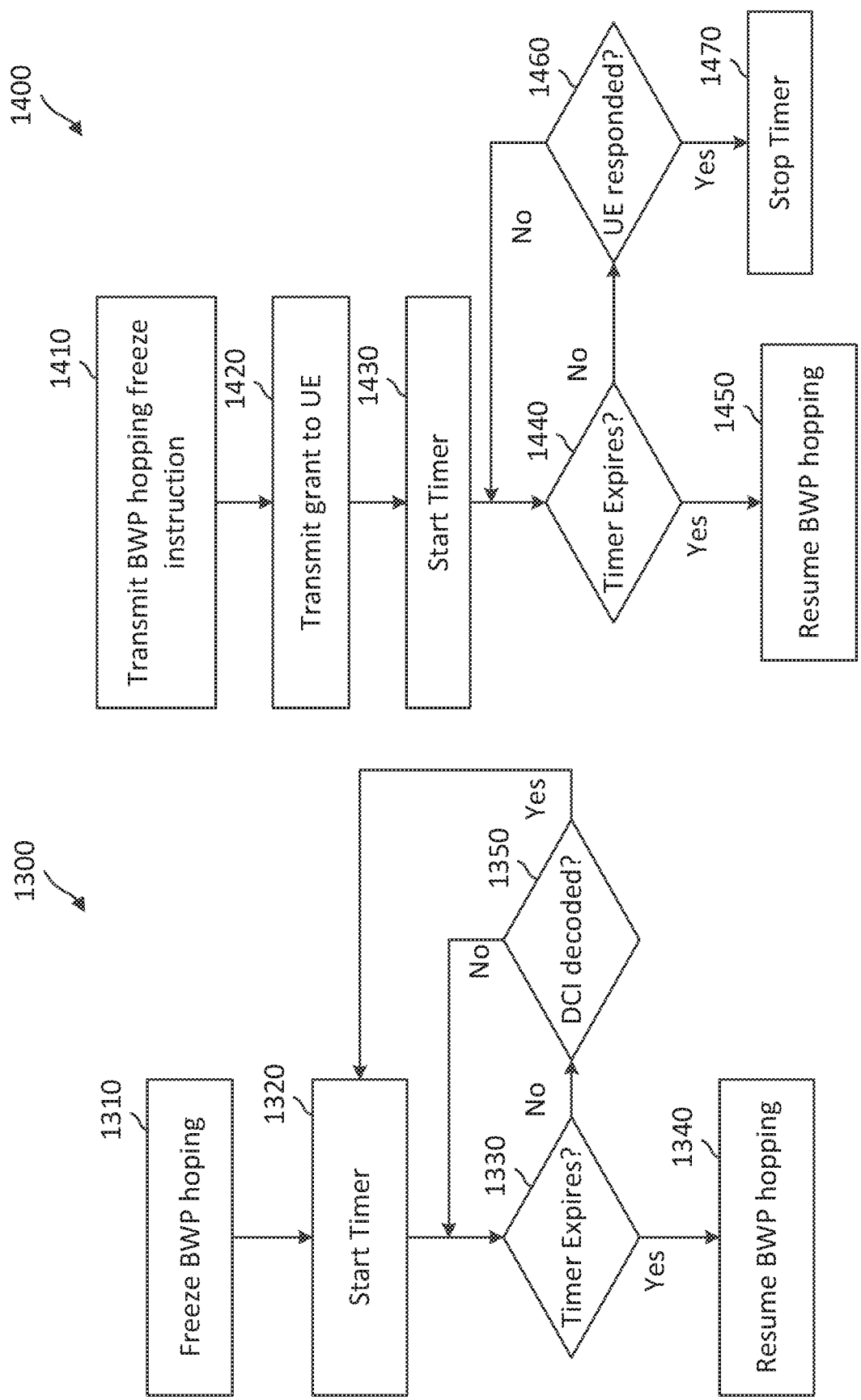

BANDWIDTH PART (BWP) HOPPING FOR INTERFERENCE MITIGATION

CROSS REFERENCE TO RELATED APPLICATIONS

The present application claims priority to and the benefit of U.S. Provisional Patent Application No. 62/897,176, filed Sep. 6, 2019, which is hereby incorporated by reference in its entirety as if fully set forth below and for all applicable purposes.

TECHNICAL FIELD

The application technology discussed below relates to wireless communication systems, and more particularly to mitigating interference in new radio-unlicensed (NR-U) lite by performing bandwidth part (BWP) hopping.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. Wideband operations have been considered in NR-U where the system bandwidth may be partitioned into multiple subbands. For example, the system bandwidth may be about 80 megahertz (MHz) and may be partitioned into about four 20 MHz subbands. A BS may perform LBTs in one or more subbands within the system bandwidth. Depending on the LBT outcomes, the BS may access one or more subbands for communications with UEs. The BS may configure a wideband UEs (e.g., operating over a bandwidth greater than 20 MHz) to monitor multiple subbands at a time for communications with the BS.

NR can be extended to support communications with low-cost, narrowband wireless communication devices (e.g., Internet of thing (IoT) devices). The deployment of NR-U for low-cost wireless communication devices are referred to as NR-U lite. The low-cost devices may be designed to operate over a narrower bandwidth (e.g., with transmissions and/or receptions limited to about 20 MHz or less), with a reduced transmission power (e.g., of about 14 decibel-milliwatt (dBm) to about 18 dBm), and/or with a reduced number of antennas compared to wideband UEs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE) from a base station (BS), a bandwidth part (BWP) configuration indicating a first BWP hopping pattern in a plurality of frequency subbands within a shared radio frequency band; monitoring, by the UE, for a first communication signal in a first frequency subband of the plurality of frequency subbands; performing, by the UE, BWP hopping from the first frequency subband to a second frequency subband of the plurality of frequency subbands based on the first BWP hopping pattern; and monitoring, by the UE after performing the BWP hopping, for a second communication signal in the second frequency subband.

In an additional aspect of the disclosure, a user equipment (UE) includes a transceiver configured to receive, from a base station (BS), a bandwidth part (BWP) configuration indicating a first BWP hopping pattern in a plurality of frequency subbands within a shared radio frequency band; and a processor configured to monitor for a first communication signal in a first frequency subband of the plurality of frequency subbands; perform BWP hopping from the first frequency subband to a second frequency subband of the plurality of frequency subbands based on the first BWP hopping pattern; and monitor, after performing the BWP hopping, for a second communication signal in the second frequency subband.

In an additional aspect of the disclosure, a non-transitory computer-readable medium having program code recorded thereon, the program code includes code for causing a user equipment (UE) to receive, from a base station (BS), a bandwidth part (BWP) configuration indicating a first BWP hopping pattern in a plurality of frequency subbands within a shared radio frequency band; code for causing the UE to monitor for a first communication signal in a first frequency subband of the plurality of frequency subbands; code for causing the UE to perform BWP hopping from the first frequency subband to a second frequency subband of the plurality of frequency subbands based on the first BWP hopping pattern; and code for causing the UE to monitor, after performing the BWP hopping, for a second communication signal in the second frequency subband.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 13 is a flow diagram of a BWP hopping method according to some aspects of the present disclosure.

FIG. 14 is a flow diagram of a BWP hopping method according to some aspects of the present disclosure.

DETAILED DESCRIPTION

Figure 1:
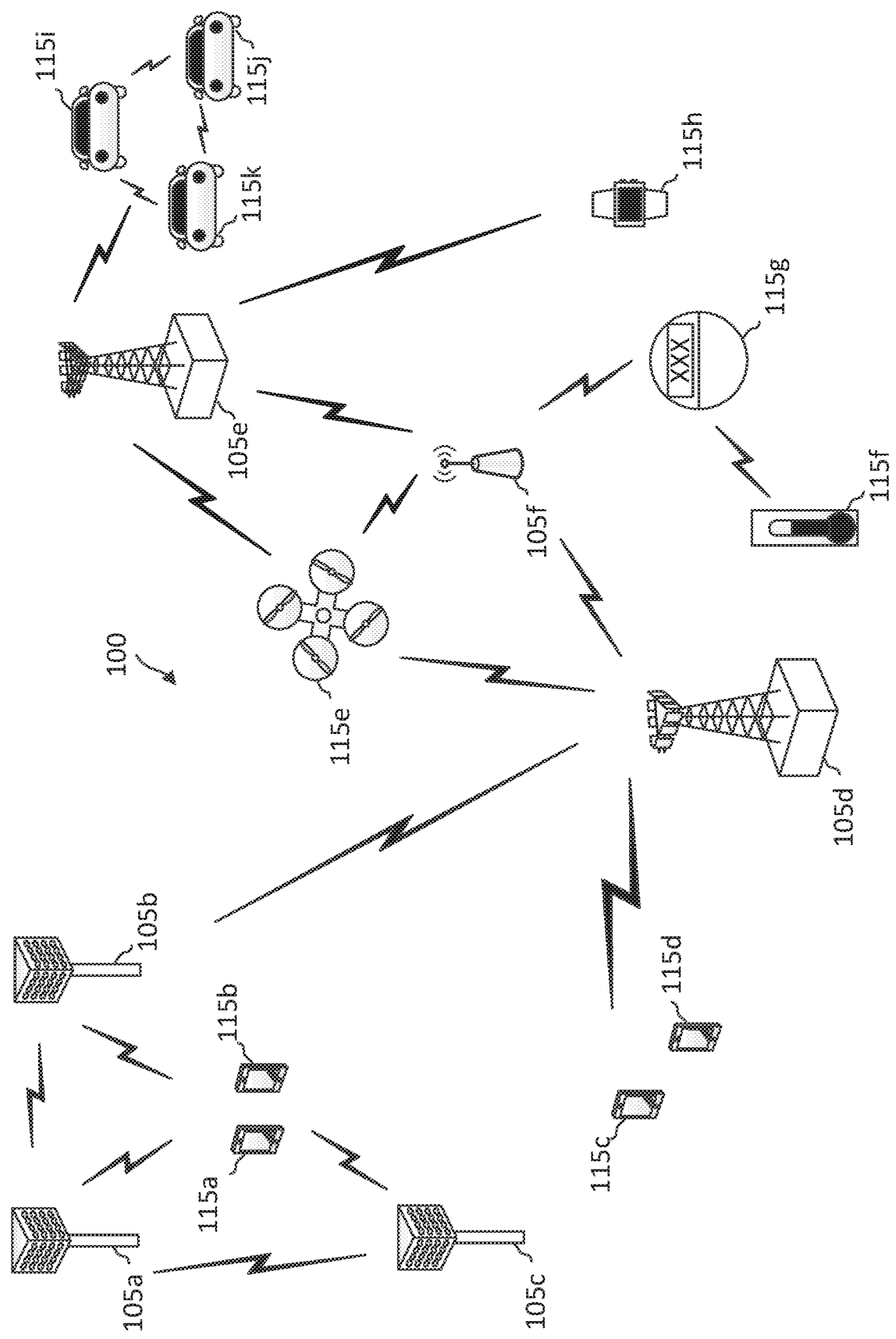
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, such as a NR-U lite network, a base station (BS) may communicate with user equipments (UEs) having transmission and/or reception capabilities over a narrowband with a bandwidth of 20 MHz or less. The BS may operate over a wideband frequency band with a bandwidth of 80 MHz or more. The wideband frequency band may be partitioned into a plurality of subbands (e.g., with a BW of about 20 MHz). The BS may perform a listen-before-talk (LBT) in each subband. The BS may schedule a UE for communication in a subband with an LBT pass. However, the narrowband UE may monitor one subband at a time. Depending on the interference, the subband monitored by the UE may be blocked while the BS may have access to another subband. The BS can direct the UE to a cleared subband (with a LBT pass). However, the instruction to direct the UE to the clear subband can also be corrupted by interference.

The present application describes mechanisms for performing BWP hopping in a shared radio frequency band (e.g., in a shared spectrum or an unlicensed spectrum) to mitigate interference. The frequency band may be partitioned into a plurality of subbands, where LBTs may be performed per subband. A BS may establish a connection with a UE in a default BWP corresponding to one of the subbands. The BS may configure the UE with a BWP hopping pattern for the BWP. The BWP hopping pattern may include a plurality of hops where the BWP may hop from one subband to another subband in a certain sequence. The BWP hopping pattern may also include a dwell time or duration for each hop. The BS may transmit a BWP hopping activation to instruct the UE to perform BWP hopping according to the BWP hopping pattern. The UE may perform channel monitoring by switching a BWP from one subband to another subband based on the BWP hopping pattern. The BS may perform listen-before-talks (LBTs) for communication with the UE by hopping from one subband to another subband based on the BWP hopping pattern. The BS may also transmit a BWP hopping deactivation to instruct the UE to stop BWP hopping after the activation. The activation and/or deactivation can be based on channel measurements and/or interference detection in the subbands.

In some instances, when the BS acquires a channel occupancy time (COT) in a current subband at a later time towards the end of a dwell time of the subband, the BS and the UE may continue to use the COT for communication even when the COT extends outside of the dwell time. In some instances, the BS may transmit a BWP hopping freeze instruction to instruct the UE to remain in a current subband without hopping to another subband. The BS may also transmit a BWP hopping resume instruction to instruct the UE to resume BWP hopping after the BWP hopping freeze. In some instances, the BS may configure the UE with multiple BWP hopping patterns and reconfigure the UE to switch from one BWP hopping pattern to another BWP hopping pattern. In some instances, the BS may instruct the UE to perform BWP hopping to a next hop at an earlier time than a starting of a dwell time configured for the next hop. The BWP hopping freeze, the BWP hopping resume, the BWP hop extension, the BWP hopping reconfiguration, and/or the BWP hopping early trigger can be based on channel measurements and/or interference detection in the subbands.

In some instances, the BS may transmit DL data to the UE while the BWP is in one subband and the UE may transmit a hybrid automatic repeat request (HARQ) acknowledgement/negative-acknowledgement (ACK/NACK) for the data in another subband after a BWP hopping. The disclosed embodiments may use the terms "BWP hopping" and "frequency hopping" interchangeably.

Aspects of the present application can provide several benefits. For example, the use of BWP hopping allows the BS and the UE to use different subbands at different time for communications, and thus the BS and the UE may avoid being stuck in a subband when the subband is impacted by interference. The use of the BWP hopping activation, the BWP hopping deactivation, the BWP hopping reconfiguration, the BWP hopping freeze, the BWP hopping resume, the extending of a hop time, and/or the early start for a certain hop provides the BS with the flexibility to adapt to changes in interference in the subbands and/or to redistribute UEs over the subbands. The use of the BWP hopping freeze can further reduce BWP switching overhead. The hop time extension can further improve spectrum utilization. The provision for data and corresponding ACK/NACKs to be transmitted in different subbands or BWPs allows for continuity in HARQ processes, and thus may improve HARQ performances.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

The BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some instances, the BS 105 may communicate data with the UE 115 using hybrid automatic request (HARQ) to improve communication reliability. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications. The BS 105 may additionally configure the UE 115 with one or more CORESETs in a BWP. A CORESET may include a set of frequency resources spanning a number of symbols in time. The BS 105 may configure the UE 115 with one or more search spaces for PDCCH monitoring based on the CORESETS. The UE 115 may perform blind decoding in the search spaces to search for DL control information (e.g., UL and/or DL scheduling grants) from the BS. In an example, the BS 105 may configure the UE 115 with the BWPs, the CORESETS, and/or the PDCCH search spaces via RRC configurations.

In some aspects, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (e.g., a preamble signal sequence) is detected in the channel.

Further, the BS 105 may configure UEs 115 with narrowband operation capabilities (e.g., with transmission and/or reception limited to a BW of 20 MHz or less) to perform BWP hopping for channel monitoring and communications. Mechanisms for performing BWP hopping are described in greater detail herein.

Figure 2:
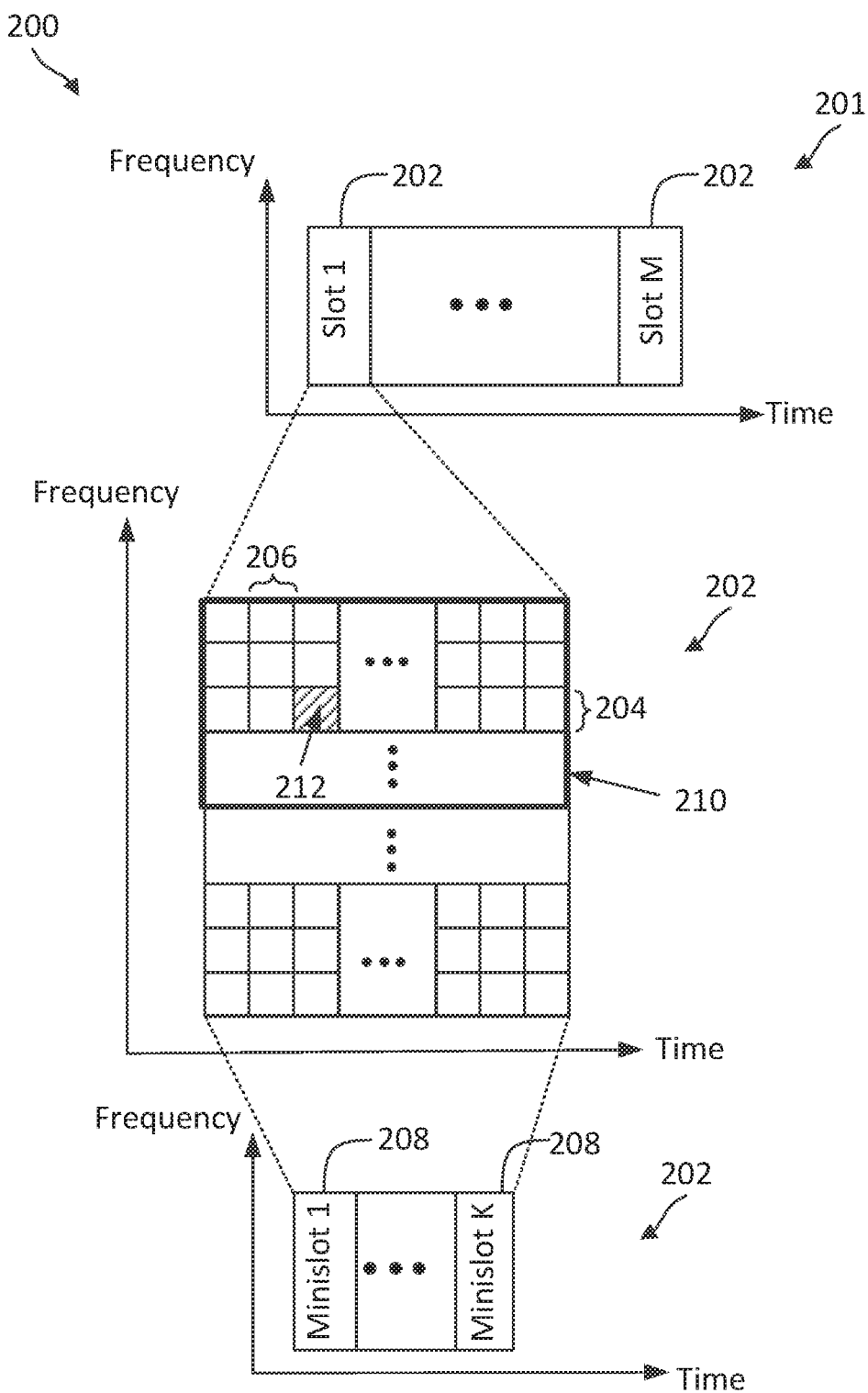
FIG. 2 is a timing diagram illustrating a transmission frame structure according to some aspects of the present disclosure.

FIG. 2 is a timing diagram illustrating a transmission frame structure 200 according to some aspects of the present disclosure. The transmission frame structure 200 may be employed by BSs such as the BSs 105 and UEs such as the UEs 115 in a network such as the network 100 for communications. In particular, the BS may communicate with the UE using time-frequency resources configured as shown in the transmission frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the embodiments. In some instances, the radio frame 201 may have a duration of about ten milliseconds. The radio frame 201 includes M number of slots 202, where M may be any suitable positive integer. In some instances, M may be about 10 and the slots 202 may be indexed from 0 to 9 in a radio frame 201.

Each slot 202 includes a number of subcarriers 204 in frequency and a number of symbols 206 in time. The number of subcarriers 204 and/or the number of symbols 206 in a slot 202 may vary depending on the embodiments, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some instances, a mini-slot 208 may have a length of about two symbols 206, about four symbols 206, or about seven symbols 206. In some aspects, the BS may schedule UE at a frequency-granularity of a resource block (RB) 210 (e.g., including about 12 subcarriers 204).

Figure 3:
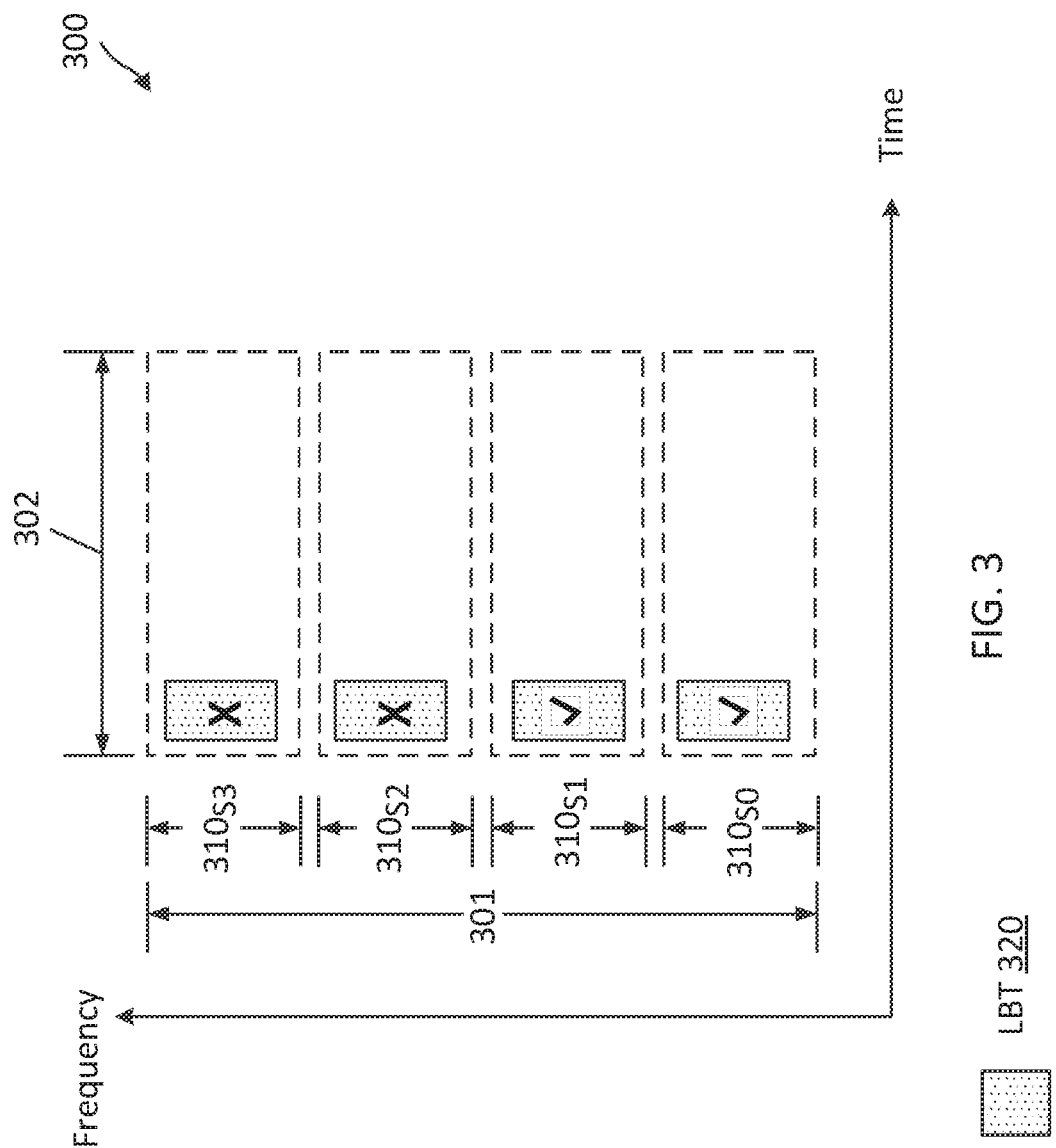
FIG. 3 illustrates a bandwidth part (BWP) configuration according to some aspects of the present disclosure.

FIG. 3 illustrates a subband configuration 300 according to some aspects of the present disclosure. The configuration 300 may be employed by a network such as the network 100. In particular, BSs such as the BSs 105 and UEs such as the UEs 115 may communicate with each other using the configuration 300. In some instances, the configuration 300 can be employed in conjunction with the transmission frame structure 200. In FIG. 3, the x-axes represent time in some arbitrary units and the y-axes represent frequency in some arbitrary units. The configuration 300 includes a frequency band 301, for example, in an unlicensed spectrum or a shared spectrum where the network may be deployed. The frequency band 301 may be partitioned into a plurality of subbands 310. As an example, the frequency band 301 may be about 80 MHz wide and may be partitioned into about four subbands $310_{S0}$, $310_{S1}$, $310_{S2}$, and $310_{S3}$) of about 20 MHz each. However, the frequency band 301 may be alternatively configured to include any suitable bandwidth (e.g., about 100 MHz or more) and may be partitioned into any suitable number of subbands 310 (e.g., about 2, 3, 5, 6, or more). A BS (e.g., the BSs 105) or a UE (e.g., the UE 115) may perform LBTs in units of subbands 310. Thus, the subbands 310 may be referred to as LBT subbands.

For spectrum sharing, a BS may perform an LBT 320 in each of the subbands 310. The LBT 320 may be based on energy detection and/or signal decoding. Depending on the outcomes of the LBTs 320, the BS may access one or more of the subbands 310. As an example, the LBTs 320 in the subbands $310_{S0}$ and $310_{S1}$ are successful (as shown by the checkmarks) and the LBTs 320 in the subbands 310$_{S2}$ and 310$_{S3}$ failed (as shown by the cross symbols). In other words, the subbands 310$_{S0}$ and 310$_{S1}$ are cleared for transmission, whereas the subbands 310$_{S2}$ and 310$_{S3}$ are busy and blocked for transmission. After gaining access to the subbands 310$_{S0}$ and 310$_{S1}$, the BS may reserve a COT in the subbands 310$_{S0}$ and/or 310$_{S1}$ for a time period 302 and schedule one or more UEs for communications in the subbands 310$_{S0}$ and/or 310$_{S1}$. The COT may include one or more slots (e.g., the slots 202) and/or one or more mini-slots (e.g., the mini-slots 208). In some instances, the BS may transmit a reservation signal at the beginning of the COT to indicate that the COT is reserved. The reservation signal may include a predetermined sequence and/or any information related to the COT or scheduling in the COT.

In some aspects, the BS may configure a UE with wideband transmission and/or reception capabilities (e.g., of greater than 20 MHz) with a wideband BWP, for example, spanning two more subbands 310. The BS may configure the wideband UE to monitor multiple CORESETs in the wideband BWP. The BS may schedule the wideband UE for communications in one more subbands 310 with an LBT pass. For example, the BS may configure the wideband UE to monitor CORESETs for PDCCHs (e.g., UL and/or DL scheduling grants) in a wideband BWP including all the subbands 310. After gaining access to the subbands 310$_{S0}$ and 310$_{S1}$, the BS may schedule the wideband UE to communicate over the subbands 310$_{S0}$ and 310$_{S1}$.

As described above, some UEs may be low-cost devices with transmission and/or reception limited to a narrowband (e.g., with BW of 20 MHz or less). In other words, the narrowband UEs can monitor and/or communicate with the BS in one subband 310 at any given time. Thus, the narrowband UEs can be more susceptible to interference than wideband UEs. For example, a narrowband UE may be configured with an active BWP in the subband 310$_{S3}$. The narrowband UE may monitor for communications from the BS in the subband 310$_{S3}$. However, there may be interference in the subband 310$_{S3}$ during a certain time period (e.g., the time period 302). Thus, the BS may not gain access to the subband 310$_{S3}$ as shown by the failed LBT 320. Similarly, if the UE attempt to perform an LBT in the subband 310$_{S3}$ during the time period 302, the LBT may fail and the UE may not gain access to the subband 310$_{S3}$.

As can be observed, while the BS had gained access to the cleared subbands 310$_{S0}$ and 310$_{S1}$, the narrowband UE may not be able to communicate with the BS since the narrowband UE is monitoring the subband 310$_{S3}$. One approach to overcoming the above scenario is for the BS to configure the UE to switch to a different BWP (e.g., in the cleared subband 3100. For example, the BS may transmit a BWP switching downlink control information (DCI) to the UE to trigger a dynamic BWP switch. However, interference is unpredictable. The interference may come and go at any time and may hop from one subband 310 to another subband 310, and thus may also impact the reception of the BWP switching DCI at the narrowband UE. If the narrowband UE miss detects the BWP switching DCI, the narrowband UE may continue to monitor the subband 310$_{S3}$ while the BS attempts to schedule the narrowband UE for communication in the subband 310$_{S0}$. Thus, the miss detection can cause the BS and the narrowband UE to be out-of-sync. While the BS may utilize a timer to trigger a fallback to the subband 310$_{S3}$ when no response is received from the UE in the 310$_{S0}$, the BS may have already wasted airtime or spectrum resources in the subband 310$_{S0}$ attempting to communicate with the narrowband UE.

Further, a successful BWP switching may still impact HARQ performance. As described above, a transmitter may transmit a data block and a receiver may provide the transmitter with an ACK/NACK report indicating whether the data block was successfully received and decoded. Certain wireless communication protocols may limit the ACK/NACK report to be transmitted in the same BWP as where the data block was received. For example, the BS may have transmitted a DL data block to the narrowband UE in the subband 310$_{S3}$. The UE may have successfully decoded the DL data block. However, the UE may not be able to gain access to the subband 310$_{S3}$ for the ACK/NACK report transmission. The BS may switch the narrowband UE to the BWP in the subband 310$_{S0}$. The UE may receive the BWP switch request and successfully switch to the subband 310$_{S0}$. However, the UE may not transmit the ACK/NACK report in the subband 310$_{S0}$ after the BWP switch since the DL data block was received in a different subband 310$_{S3}$. The missing ACK/NACK report can cause the BS to retransmit the DL data block that is already received and decoded successfully by the UE. As such, the BWP switching can cause inefficiency in HARQ and spectrum utilization.

Accordingly, the present disclosure provides techniques for a BS to configure narrowband UEs to hop around the subbands 310 for channel monitoring and/or communications with the BS. The hopping around allows the UEs to avoid being stuck in a subband 310 that is impacted by interference. Further, the BS can configure the UEs with a certain frequency hopping pattern to avoid subbands 310 that are impacted by interference.

Figure 4:
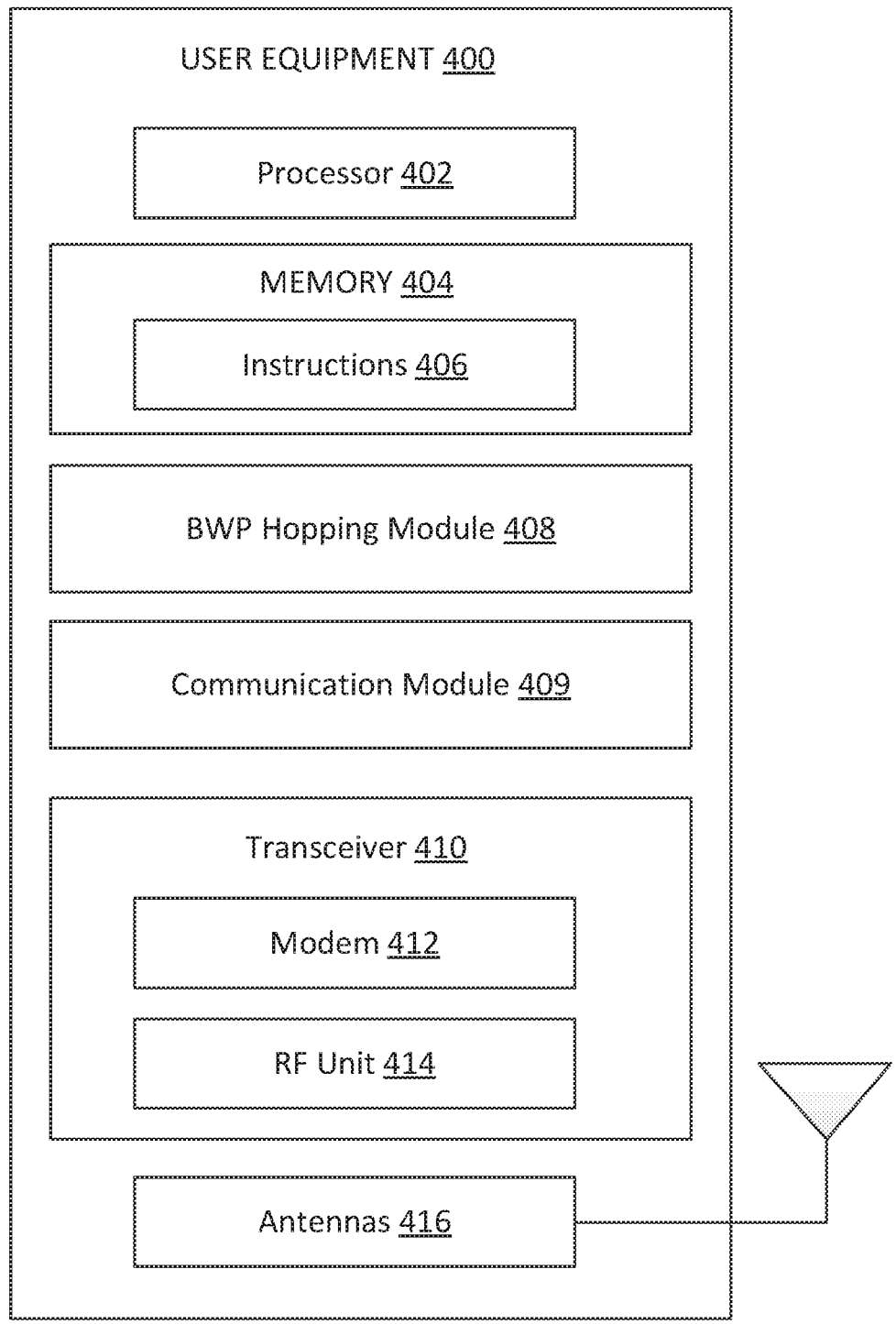
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1, for example. As shown, the UE 400 may include a processor 402, a memory 404, a BWP hopping module 408, a communication module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with embodiments of the present disclosure, for example, aspects of FIGS. 2-3 and 6-17. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

Each of the BWP hopping module 408 and the communication module 409 may be implemented via hardware, software, or combinations thereof. For example, each of the BWP hopping module 408 and the communication module 409 may be implemented as a processor, circuit, and/or instructions 406 stored in the memory 404 and executed by the processor 402. In some examples, the BWP hopping module 408 and the communication module 409 can be integrated within the modem subsystem 412. For example, the BWP hopping module 408 and the communication module 409 can be implemented by a combination of software components (e.g., executed by a DSP or a general processor) and hardware components (e.g., logic gates and circuitry) within the modem subsystem 412. In some examples, a UE may include one of the BWP hopping module 408 and the communication module 409. In other examples, a UE may include both the BWP hopping module 408 and the communication module 409.

The BWP hopping module 408 and the communication module 409 may be used for various aspects of the present disclosure, for example, aspects of FIGS. 2-3 and 6-17. The BWP hopping module 408 is configured to receive a BWP hopping configuration from a BS (e.g., the BSs 105) indicating one or more BWP hopping patterns. Each BWP hopping pattern may include a plurality of hops where a BWP may hop from one subband to another subband in a certain sequence.

The BWP hopping module 408 is further configured to receive a BWP hopping activation from the BS indicating to use a first BWP hopping pattern, perform BWP hopping and channel monitoring based on the first BWP hopping pattern, receive a BWP hopping reconfiguration from the BS indicating to use a second BWP hopping pattern different from the first BWP hopping pattern, perform BWP hopping and channel monitoring based on the second BWP hopping pattern, receive a BWP hopping freeze instruction from the BS, perform channel monitoring without BWP hopping based on the BWP hopping freeze instruction, receive a BWP hopping resume instruction from the BS, resume BWP hopping based on the BWP hopping resume instruction, receive an early hop instruction to hop to a next hop at an earlier time than a time preconfigured for the next hop, switch to the next hop at the earlier time based on the early hop instruction, receive a BWP hopping deactivation from the BS, and stop BWP hoping based on the BWP hopping deactivation.

The BWP hopping module 408 is further configured to configure a timer for fallback to a default BWP or a default BWP hopping pattern. The BWP hopping module 408 is further configured to configure transceiver 410 and/or the RF unit 414 (e.g., filters, clock) to switch from one BWP to another BWP.

The communication module 409 is configured to coordinate with the BWP hopping module 408 to receive the BWP hopping instructions (e.g., BWP hoping patters, activation, deactivation, freeze, resume, and/or reconfiguration) from the BS for BWP hopping, perform channel monitoring, receive UL and/or DL scheduling grants from the BS, and/or communicate with the BS according to the UL and/or DL scheduling grants. The communication module 409 is further configured to receive DL data from the BS in one subband and transmit an ACK/NACK for the DL data in another subband after performing BWP hopping. Mechanisms for performing BWP hopping are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the BWP hopping module 408, and/or the communication module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUCCH, PUSCH, channel reports, ACK/NACKs) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., DL data blocks, PDSCH, PUSCH, BWP hopping configurations and/or instructions) to the BWP hopping module 408 and/or communication module 409 for processing. The antennas 416 may include multiple antennas of similar or different designs in order to sustain multiple transmission links. The RF unit 414 may configure the antennas 416.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement different RATs.

Figure 5:
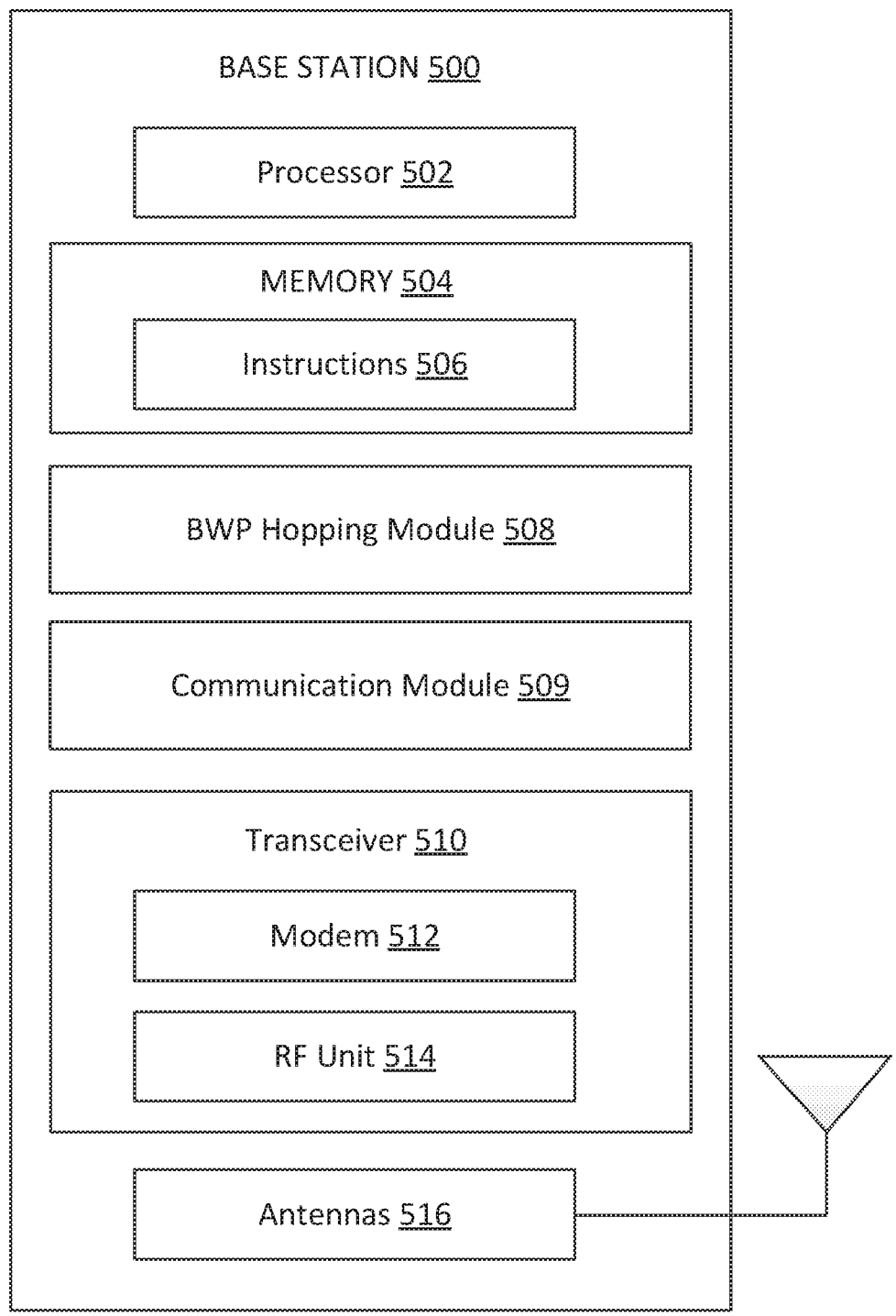
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 as discussed above in FIG. 1, for example. As shown, the BS 500 may include a processor 502, a memory 504, a BWP hopping module 508, a communication module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3 and 6-16, and 18. Instructions 506 may also be referred to as code, which may be interpreted broadly to include any type of computer-readable statement(s) as discussed above with respect to FIG. 4.

Each of the BWP hopping module 508 and the communication module 509 may be implemented via hardware, software, or combinations thereof. For example, each of the BWP hopping module 508 and the communication module 509 may be implemented as a processor, circuit, and/or instructions 506 stored in the memory 504 and executed by the processor 502. In some examples, the BWP hopping module 508 and the communication module 509 can be integrated within the modem subsystem 512. For example, the BWP hopping module 508 and the communication module 509 can be implemented by a combination of software components (e.g., executed by a DSP or a general processor) and hardware components (e.g., logic gates and circuitry) within the modem subsystem 512. In some examples, a UE may include one of the BWP hopping module 508 and the communication module 509. In other examples, a UE may include both the BWP hopping module 508 and the communication module 509.

The BWP hopping module 508 and the communication module 509 may be used for various aspects of the present disclosure, for example, aspects of FIGS. 2-3 and 6-16, and 18. The BWP hopping module 508 is configured to transmit a BWP hopping configuration to a UE (e.g., the UEs 115 and 400) indicating one or more BWP hopping patterns. Each BWP hopping pattern may include a plurality of hops where a BWP may hop from one subband to another subband in a certain sequence.

The BWP hopping module 508 is further configured to transmit a BWP hopping activation to the UE indicating to use a first BWP hopping pattern, perform LBTs in the subbands by hopping from one suband to another subband based on the first BWP hopping pattern after the activation, transmit a BWP hopping reconfiguration to the UE indicating to use a second BWP hopping pattern different from the first BWP hopping pattern, perform LBTs in the subbands by hopping from one suband to another subband based on the second BWP hopping pattern, transmit a BWP hopping freeze instruction to the UE, perform LBT in a current subband after the BWP hopping freeze, transmit a BWP hopping resume instruction to the UE, perform LBTs in the subbands by resuming hopping from one suband to another subband after the BWP hopping resume, transmit an early hop instruction to hop to a next hop at an earlier time than a time preconfigured for the next hop, perform LBTs in a next hop at the earlier time after triggering the early hop transition, transmit a BWP hopping deactivation to the UE, and perform LBTs in the subbands without hopping after BWP hopping deactivation. The BWP hopping module 508 is further configured to configure a timer for fallback to a default BWP or a default BWP hopping pattern.

The communication module 509 is configured to coordinate with the BWP hopping module 508 to transmit the BWP hopping instructions (e.g., BWP hoping patters, activation, deactivation, freeze, resume, and/or reconfiguration) to the UE for BWP hopping, perform the LBTs, transmit UL and/or DL scheduling grants to the UE, and/or communicate with the UE according to the UL and/or DL scheduling grants. The communication module 509 is further configured to transmit DL data to the UE in one subband and receive an ACK/NACK for the DL data from the UE in another subband after performing BWP hopping. Mechanisms for performing BWP hopping are described in greater detail herein.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., BWP hoping configurations and instructions, PDCCH, PDSCH) from the modem subsystem 512 (on outbound transmissions) or of transmissions originating from another source such as a UE 115 and 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The transceiver 510 may provide the demodulated and decoded data (e.g., channel reports, PUSCH, PUCCH, HARQ ACK/NACKs) to the BWP hopping module 508 and/or communication module 509 for processing. The antennas 516 may include multiple antennas of similar or different designs in order to sustain multiple transmission links.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement different RATs.

Figure 6:
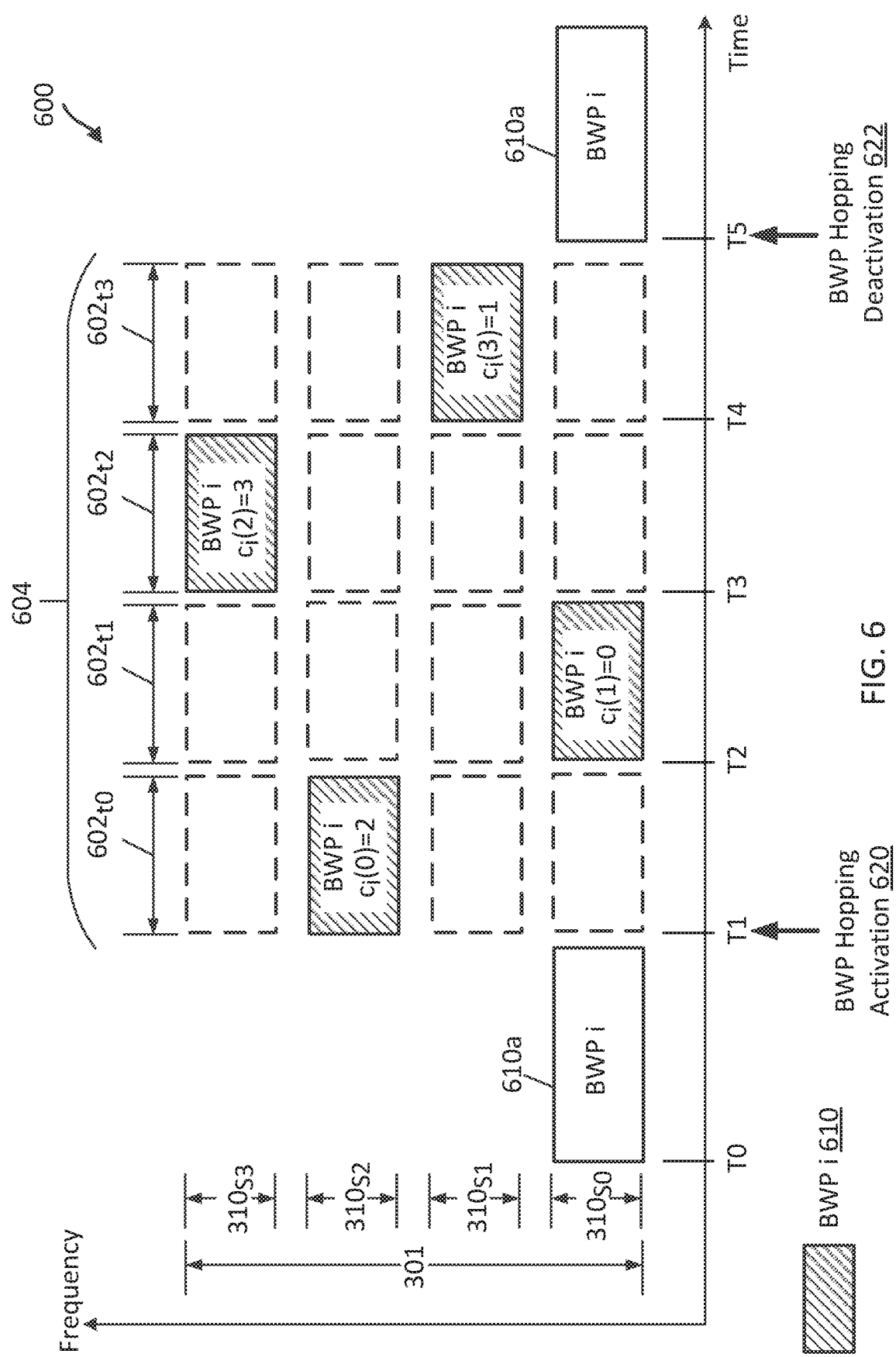
FIG. 6 illustrates a BWP hopping scheme according to some aspects of the present disclosure.
Figure 7:
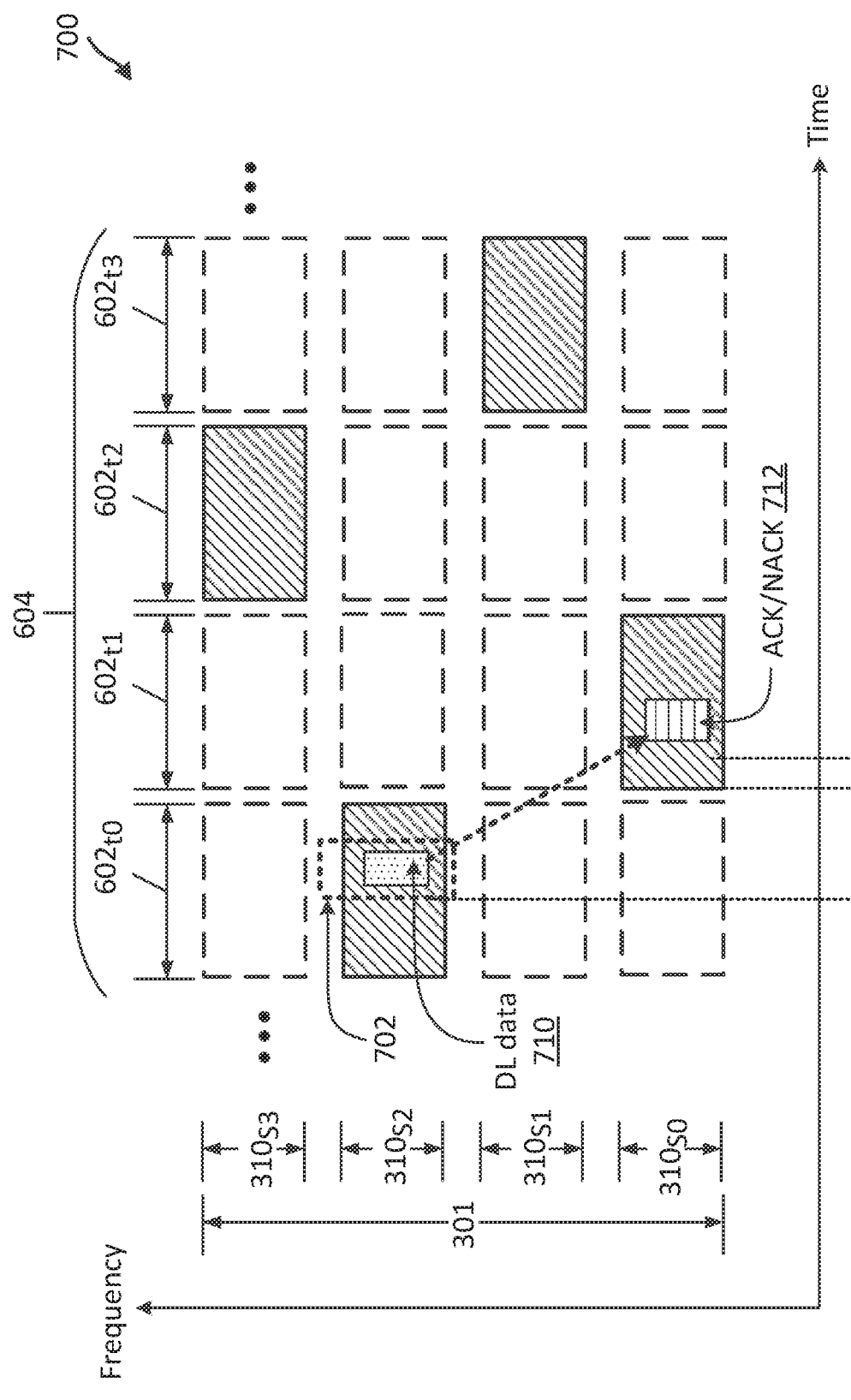
FIG. 7 illustrates a hybrid automatic repeat request (HARQ) scheme with BWP hopping according to some aspects of the present disclosure.
Figure 8:
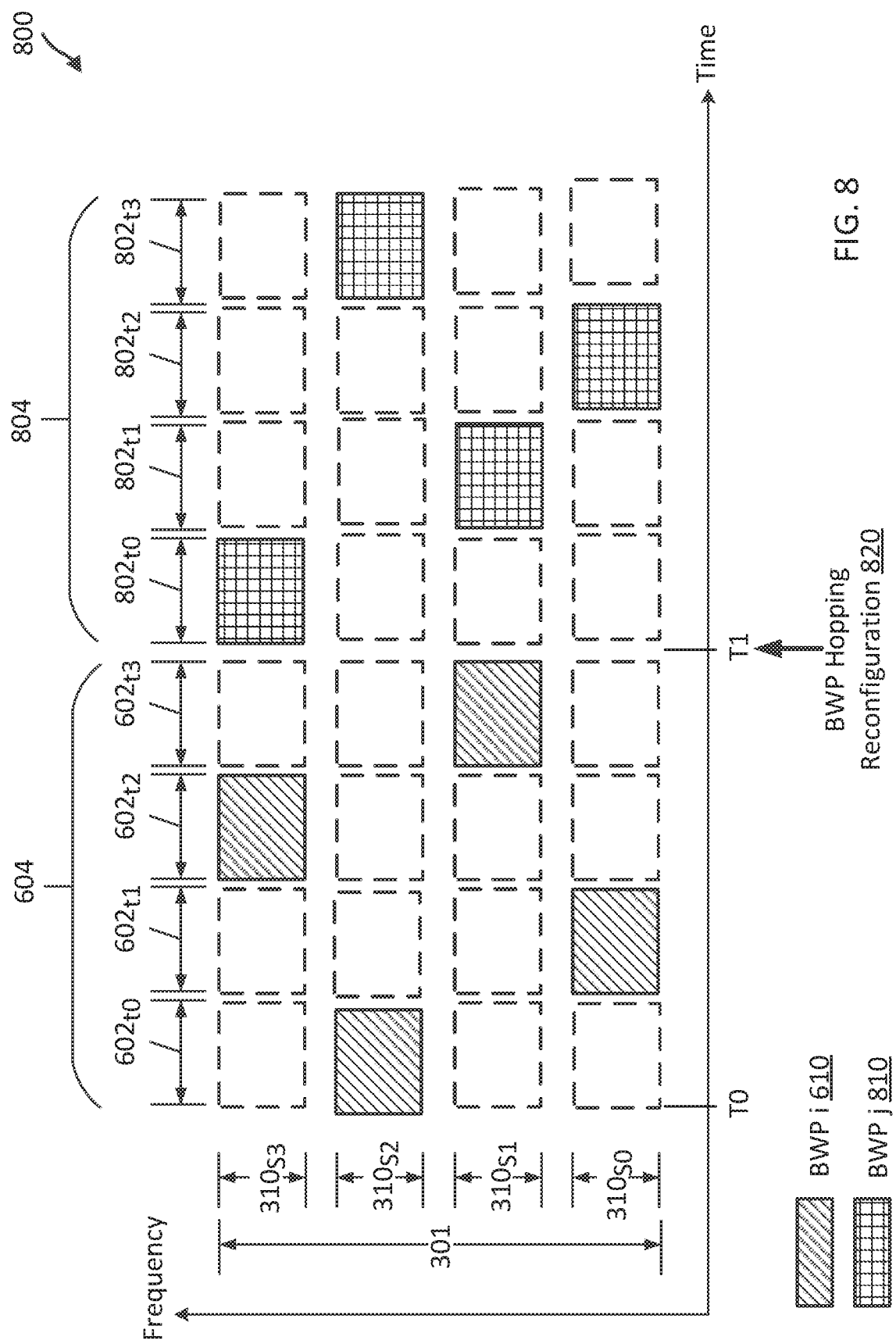
FIG. 8 illustrates a BWP hopping scheme according to some aspects of the present disclosure.

FIGS. 6-8 illustrate various mechanisms for performing BWP hopping around multiple LBT subbands. In FIGS. 6-8, the schemes 600, 700, and/or 800 may be employed by a BS such as the BSs 105 and/or 500 and a UE such as the UEs 115 and/or 400 in a network such as the network 100 operating over a shared frequency band or an unlicensed frequency band. In particular, the BS may configure a UE to hop around multiple subbands for communications with the BS as shown in the schemes 600, 700, and/or 800. The UE may be a low-cost UE device that operates over a narrowband of about 20 MHz or less. Additionally, in FIGS. 6-8, the x-axes represent time in some constant units and the y-axes represent frequency in some constant units. Further, the schemes 600-800 are described using the subband configuration 300 shown in FIG. 3, and may use the same reference numerals as in FIG. 3 for simplicity's sake.

FIG. 6 illustrates a BWP hopping scheme 600 according to some aspects of the present disclosure. In the scheme 600, a BS (e.g., the BSs 105 and 500) may configure a UE (e.g., the UEs 115 and 400) with an active BWP that may hop around multiple LBT subbands. The BS may define LBT subbands 310 in a frequency spectrum 301 as shown in the configuration 300. The BS may configure BWPs in the LBT subbands 310. For M number of LBT subbands 310, the BS may configure each BWP i with M frequency starting positions for frequency hopping such that the BWP i may fall within one of the LBT subbands 310 in each hop. The M frequency starting positions for the BWP i may be expressed as shown below:

$$N_{BWP\ i,0}, N_{BWP\ i,1}, N_{BWP\ i,2}, \ldots, N_{BWP\ i,M-1}. \quad (1)$$

Each of the frequency starting positions may correspond to a starting frequency of a subband 310. Thus, the M frequency starting positions may be in increments of a subband 310's BW. The BS may configure the BWP i to hop from one frequency starting position to another frequency starting position. The frequency starting position $N_{BWP\ i,0}$ may be referred to as a default BWP starting position. In other words, if hopping is not activated, the BWP i may have the frequency starting position $N_{BWP\ i,0}$. As an example, M is 4 as shown in FIG. 6 and each subband 310 may have a BW of about 20 MHz. Thus, a BWP i may have 4 frequency starting positions $N_{BWP\ i,0}$, $N_{BWP\ i,1}$, $N_{BWP\ i,2}$, $N_{BWP\ i,3}$ at 0 MHz, 20 MHz, 40 MHz, and 60 MHz, respectively.

At time T0, the BS establishes a connection with the UE in the subband $310_{S0}$ using mechanisms described above with respect to FIG. 1. The BS may configure the UE with a default BWP 610 in the subband $310_{S0}$ (shown as 610a) for UL and/or DL communications. The BS may perform LBT (e.g., the LBTs 320) and monitor for interference in one or more of the subbands 310. Upon gaining a COT in the subband $310_{S0}$, the BS may schedule the UE for UL communications (e.g., PUCCH and/or PUSCH communications) and/or DL communications (e.g., PDCCH and/or PDSCH communications) in the default BWP 610a. The UE may monitor for COT indication signals, UL scheduling grants, and/or DL scheduling grants from the BS in the default BWP 610a. Upon receiving a UL schedule for a UL transmission, the UE may perform an LBT (e.g., the LBTs 320) in the subband $310_{S0}$ prior to the UL transmission. The UE may report channel statuses (e.g., LBT results and/or channel state information) of the subband $310_{S0}$ to the BS, for example, via uplink control information (UCI). The BS may evaluate interference in the UE's default BWP 610a based on the channel reports and/or other channel measurements.

At time T1, the BS transmits a BWP hopping activation 620 to the UE to activate BWP hopping at the UE. The BS may determine the activation based on interference detected in the subband $310_{S0}$ and/or reports received from the UE.

The BS may configure a frequency hopping pattern 604 for the BWP 610. The frequency hopping pattern 604 includes a plurality of hops where the BWP 610 may hop from one subband 310 to another subband 310 as shown by the pattern-filled boxes. The BWP 610 may be referred to as BWP i in the following hopping discussions. In some aspects, the BS may determine the frequency hopping pattern 604 based on a predetermined sequence, denoted as c(k), where 0≤c(k)≤M−1 and k represents time. Additionally, the BS may configure a dwell time or a duration for each frequency hop. For example, at time instance k, the BWP i may have a frequency starting position $N_{BWP\ i,c(k)}$. The BWP i may remain in the frequency starting position $N_{BWP\ i,c(k)}$ for a duration of the hop.

In some aspects, the sequence c(k) can be a random sequence. In some aspects, the sequence c(k) may be dependent on a slot index, the UE identifier (ID), a cell ID, a BWP index, and/or a hop dwell time. The slot index may refer to the index of a slot (e.g., the slots 202) during which a frequency hopping is performed. The UE ID may refer to an ID identifying the UE in the network. The BWP index may refer to the index of the default BWP (e.g., 0, 1, 2, 3). In some aspects, different frequency hopping patterns may be configured for different UEs and/or different cells to gain diversity among the LBT subbands 310. The different frequency hopping patterns may facilitate distribution of UEs across the subbands 310.

In some aspects, the BS may utilize different hopping sequences c(k) for different starting BWPs or default BWPs. In other words, a default BWP in the subband $310_{S0}$ may have a different frequency hopping pattern than a default BWP in the subband $310_{S1}$. In some aspects, the BS may utilize orthogonal hopping sequences for different default BWPs. For instance, the BS may align M BWP starting positions across all configured BWPs. To provide orthogonality for the frequency hopping among the different default or starting BWPs, the BS may apply a hopping sequence c(k) as shown below for each BWP i:

$$c_i(k)=c(k)+i \bmod M, \quad (2)$$

where mod represents the modulo operator.

As shown, the BS configures the UE with a frequency hopping pattern 604 for the BWP 610 using a hopping sequence $c_i(k)$, where $c_i(0)=2$, $c_i(1)=0$, $c_i(2)=3$, and, $c_i(3)=1$. Thus, the BWP 610 may hop around the subbands 310 in the order of subbands $310_{S2}$, $310_{S0}$, $310_{S3}$, and $310_{S1}$. The BS may configure a dwell time or duration 602 for each hop. For example, the first hop in the subband $310_{S2}$ may have a duration $602_{t0}$, the second hop in the subband $310_{S0}$ may have a duration $602_{t1}$, the third hop in the subband $310_{S3}$ may have a duration $602_{t2}$, and the fourth hop in the subband $310_{S1}$ may have a duration $602_{t3}$. Each of the durations $602_{t0}$, $602_{t1}$, $602_{t2}$, and $602_{t3}$ may span one or more slots (e.g., the slots 202). In some instances, the durations $602_{t0}$, $602_{t1}$, $602_{t2}$, and $602_{t3}$ for the different hops may be the same. In some other instances, the durations $602_{t0}$, $602_{t1}$, $602_{t2}$, and $602_{t3}$ for the different hops may be different.

Upon receiving the BWP hopping activation 620, the UE performs BWP hopping to switch from the subband $310_{S0}$ to the subband $310_{S2}$ and remains in the subband $310_{S2}$ for a duration $602_{t0}$ according to the frequency hopping pattern 604.

At time T2, the UE performs BWP hopping to switch from the subband $310_{S2}$ to the subband $310_{S0}$ and remains in the subband $310_{S0}$ for a duration $602_{t1}$ according to the frequency hopping pattern 604. At time T3, the UE performs BWP hopping to switch from the subband $310_{S0}$ to the subband $310_{S3}$ and remains in the subband $310_{S3}$ for a duration $602_{t2}$ according to the frequency hopping pattern 604. At time T4, the UE performs BWP hopping to switch from the subband $310_{S3}$ to the subband $310_{S1}$ and remains in the subband $310_{S0}$ for a duration $602_{t3}$ according to the frequency hopping pattern 604. During each hop, the UE may perform channel monitoring (e.g., PDCCH scheduling grant monitoring and/or COT indication signal monitoring) in a corresponding subband 310 and communicate with the BS based on received scheduling grants. The BS may perform LBT in the corresponding subband 310. Upon gaining a COT in the corresponding subband 310, the BS may communicate UL communications (e.g., PUCCH and/or PUSCH) and/or DL communications (e.g., PDCCH and/or PDSCH) with the UE in the corresponding subband 310.

At time T5, the BS transmits a BWP hopping deactivation 622 to the UE to deactivate BWP hopping at the UE. The BS may determine the deactivation based on interference detected in the subband $310_{S0}$ and/or reports received from the UE. Upon receiving the BWP hopping deactivation 622, the UE may perform BWP hopping to switch back to the default BWP 610a. The BS and the UE may communicate UL and/or DL communications in the default BWP 610a.

In some aspects, the UE being a narrowband device may perform the BWP hopping by configuring a frontend (e.g., the RF unit 414 and/or antennas 416) of the UE to switch from one subband 310 to another subband 310. Since the BS operates over a wideband, the BS may perform LBTs according to the frequency hopping pattern 604 when determining schedules for the UE.

In some aspects, the BS may configure the UE with the frequency hopping pattern 604 and/or dwell time 602 for each hop via a RRC configuration. The BS may signal the BWP hopping activation 620 and/or the BWP hopping deactivation 622 via dynamic DCI signaling (e.g., UE-specific DCI), media access control (MAC) control element (CE) signaling, and/or RRC configuration signaling. In some instances, when the UE does not support dynamic BWP switching, the BS may signal the BWP hopping activation 620 and/or the BWP hopping deactivation 622 via RRC configuration signaling. In some aspects, to reduce signaling overheads, the BS may activate and/or deactivate BWP hopping for a group of UEs by signaling the BWP hopping activation 620 and/or the BWP hopping deactivation 622 via group common signaling or group-DCI (G-DCI) signaling. G-DCI signaling may utilize a higher aggregation level (e.g., a greater number of repetitions) than UE-specific DCI signaling, and thus may be more robust to interference.

FIG. 7 illustrates a HARQ scheme 700 with BWP hopping according to some aspects of the present disclosure. The scheme 700 is described using the frequency hopping pattern 604 shown in the scheme 600, and may use the same reference numerals as in FIG. 6 for simplicity's sake. In the scheme 700, a BS (e.g., the BSs 105 and 500) may configure a UE (e.g., the UEs 115 and 400) with BWP hopping and may communicate with the UE using HARQ techniques. The scheme 700 allows data and a corresponding ACK/NACK to be transmitted in different BWPs or subbands 310 to provide continuity in HARQ processes instead of limiting ACK/NACK to be transmitted in the same BWP as where the data is received.

For example, at T0, the BS gains a COT 702 in the subband $310_{S2}$ after a successful LBT (e.g., the LBT 320) in the subband $310_{S2}$. Upon gaining the COT 702, the BS schedules the UE for a DL communication in the subband $310_{S2}$. The BS transmits a DL data block 710 (e.g., via a PDSCH) to the UE during the COT 702 in the subband $310_{S2}$. After receiving and decoding the DL data block 710, the UE may transmit an ACK/NACK to the BS to indicate whether the DL data block 710 is successfully decoded. The UE may perform an LBT in the subband $310_{S2}$ prior to transmitting an ACK/NACK. The LBT may fail and the UE may not gain access to the subband $310_{S2}$.

At time T1, the UE switches from the subband $310_{S2}$ to the subband $310_{S0}$ according to the frequency hopping pattern 604. At time T2, the UE may perform an LBT in the subband $310_{S0}$. The LBT may be successful. Thus, the UE transmits an ACK/NACK 712 (e.g., via a PUCCH or a PUSCH) in the subband $310_{S0}$.

FIG. 8 illustrates a BWP scheme 800 hopping according to some aspects of the present disclosure. The scheme 800 is described using the frequency hopping pattern 604 shown in the scheme 600, and may use the same reference numerals as in FIG. 6 for simplicity's sake. As described above, interference is unpredictable. In some instances, interferences can be present over multiple subbands 310. For example, the frequency band 301 may be shared with wireless communication devices of other technologies such as WiFi. WiFi probe signals as defined by IEEE 802.11ac and 802.11ax may hop across multiple subbands 310. Additionally, some wireless nodes may transmit over multiple subbands 310 via carrier aggregation. To mitigate interference, the scheme 800 provides a BS (e.g., the BSs 105 and 500) with the flexibility to configure a UE (e.g., the UEs 115 and 400) with multiple different hopping patterns and may configure the UE to switch from one frequency hopping pattern to another frequency hopping pattern.

For example, the BS may configure the UE with a frequency hopping pattern 604 and an additional frequency hopping pattern 804. The frequency hopping pattern 804 may have a different starting or default BWP 810, denoted as BWP j, in the subband $310_{S1}$ and a different hopping sequence. As an example, the frequency hopping pattern 804 may configure the BWP 810 to hop around the subbands 310 in the order of subbands $310_{S3}$, $310_{S1}$, $310_{S0}$, and $310_{S2}$. Similarly, the BS may configure dwell time or a hop duration 802 for each hop in the frequency hopping pattern 804. In some instances, the different hops in the frequency hopping pattern 804 may have the same duration 802. In some other instances, the different hops in the frequency hopping pattern 804 may have different durations 802. In some instances, the hop durations 802 of the frequency hopping pattern 804 may be the same as the hop durations 602 of the frequency hopping pattern 604. In some other instances, the hop durations 802 of the frequency hopping pattern 804 may be the different than the hop durations 602 of the frequency hopping pattern 604 Further, the hopping sequence for the frequency hopping pattern 604 and the hopping sequence for the frequency hopping pattern 804 may be orthogonal.

At time T0, the UE starts to perform BWP hopping based on the frequency hopping pattern 604.

At time T1, the BS transmits a BWP hopping reconfiguration 820 to the UE to reconfigure the UE to switch to the frequency hopping pattern 804. The reconfiguration may be based on interference detection in one or more of the subbands 310. Alternatively, the reconfiguration may be to redistribute UEs over the subbands 310. The BS may signal the BWP hopping reconfiguration 820 via BWP switching DCI signaling, MAC CE signaling, and/or RRC configuration signaling.

Upon receiving the BWP hopping reconfiguration 820, the UE may perform BWP hopping according to the frequency hopping pattern 804. For example, at time T1, the UE performs BWP hopping to switch from the subband $310_{S1}$ to the subband $310_{S3}$ and remains in the subband $310_{S3}$ for a duration $802_{t0}$ according to the frequency hopping pattern 804. After the duration $802_{t0}$ elapses, the UE may continue with the BWP hopping according to the frequency hopping pattern 804. After switching to the frequency hopping pattern 804, the BS may communicate UL and/or DL communications with the UE using substantially similar mechanisms as described above with respect to FIGS. 6 and/or 7.

Figure 10:
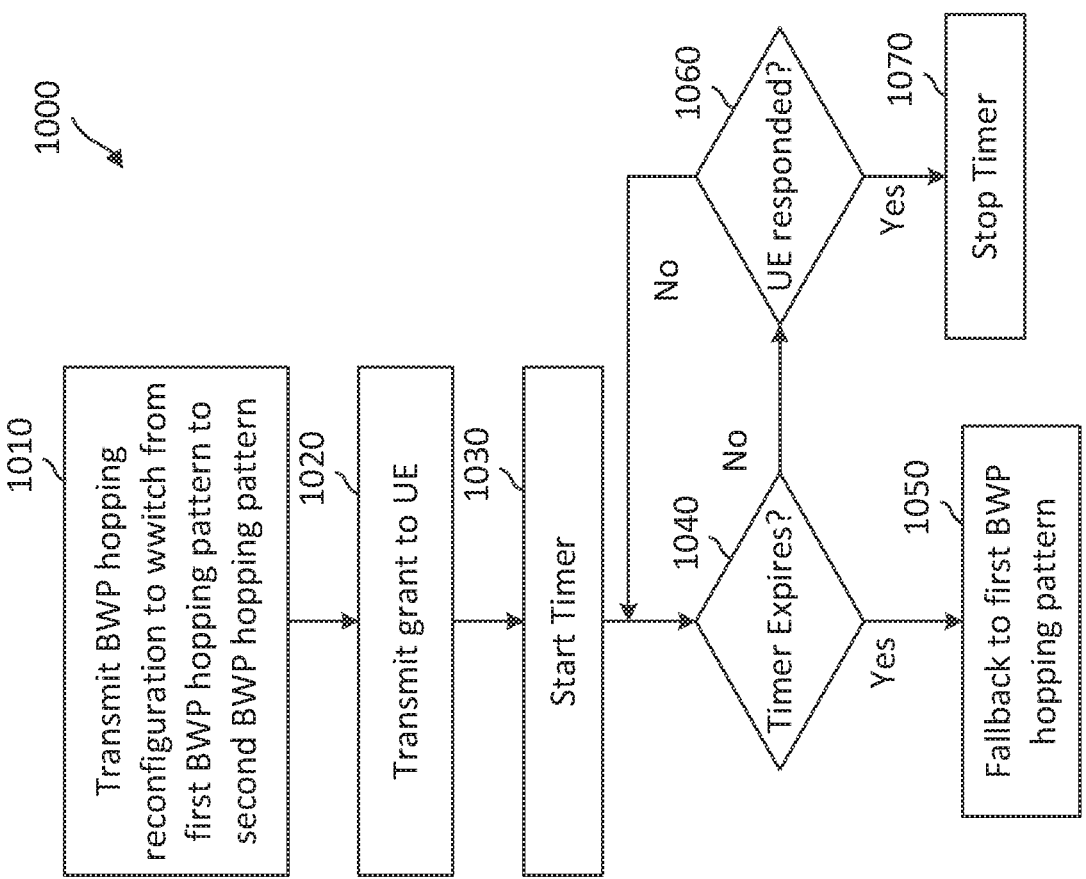
FIG. 10 is a flow diagram of a BWP hopping method according to some aspects of the present disclosure.
Figure 9:
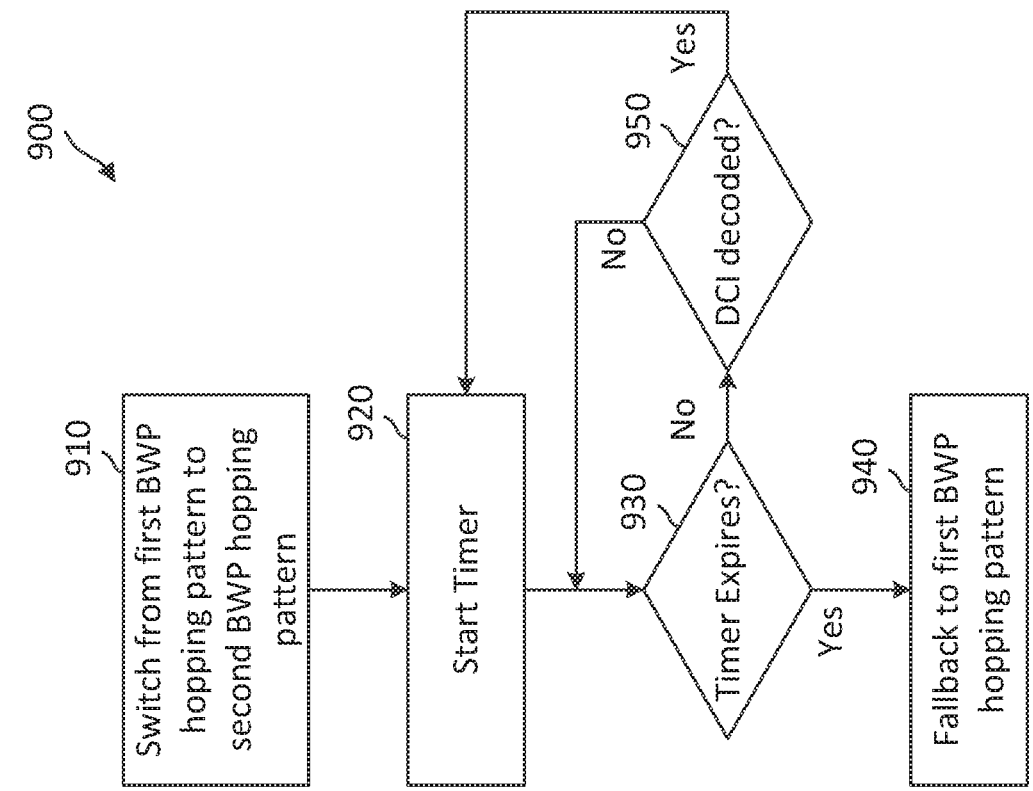
FIG. 9 is a flow diagram of a BWP hopping method according to some aspects of the present disclosure.

As described above, interference is unpredictable and can potentially corrupt a transmission over any subband 310. If the BWP hopping reconfiguration 820 is not correctly received by the UE, the BS and the UE can potentially be out-of-sync. In some other instances, the BS and the UE may be out-of-sync after the BWP hopping reconfiguration 820 due to other factors. FIGS. 9 and 10 illustrate various timer-based fallback mechanisms to recover from an out-of-sync condition between the BS and the UE in BWP hopping.

FIG. 9 is a flow diagram of a communication method 900 according to some aspects of the present disclosure. Steps of the method 900 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the BWP hopping module 408, the communication module 409, the transceiver 410, the modem 412, and the one or more antennas 416, to execute the steps of method 900. The method 900 may employ in conjunction with the scheme 800 described above with respect to FIG. 8. As illustrated, the method 900 includes a number of enumerated steps, but embodiments of the method 900 include additional steps before, after, and in between the enumerated steps. In some embodiments, one or more of the enumerated steps may be omitted or performed in a different order.

At step 910, the UE switches from a first BWP hopping pattern (e.g., the frequency hopping pattern 604) to a second BWP hopping pattern (e.g., the frequency hopping pattern 804). The switching may be based on a BWP hopping reconfiguration (e.g., the BWP hopping reconfiguration 820) received from a BS (e.g., the BS 105 or BS 500).

At step 920, the UE starts a timer. The UE may configure the timer with a timeout duration (e.g., a predetermined duration or configured by the BS).

At step 930, the UE determines whether the timer has expired. If the timer has expired, the method 900 proceeds to step 940. At step 940, the UE performs a fallback to the first BWP hopping pattern.

If the timer has not expired, the method 900 proceeds to step 950. At step 950, the UE determines whether a DCI is received from the BS and decoded successfully after switching to the second BWP hopping pattern. If the UE decoded a DCI successfully, the method 900 proceeds to step 920 and restarts the timer. If the UE did not decode a DCI successfully after switching to the second BWP hopping pattern and the timer has not expired, the method 900 returns to step 930 and continue to monitor for a DCI from the BS before the timer expires.

FIG. 10 is a flow diagram of a communication method 1000 according to some aspects of the present disclosure. Steps of the method 1000 can be executed by a computing device (e.g., a processor, processing circuit, and/or other suitable component) of a wireless communication device or other suitable means for performing the steps. For example, a wireless communication device, such as the BS 105 or BS 500, may utilize one or more components, such as the processor 502, the memory 504, the BWP hopping module 508, the communication module 509, the transceiver 510, the modem 512, and the one or more antennas 516, to execute the steps of method 1000. The method 1000 may employ in conjunction with the scheme 800 described above with respect to FIG. 8. As illustrated, the method 1000 includes a number of enumerated steps, but embodiments of the method 1000 include additional steps before, after, and in between the enumerated steps. In some embodiments, one or more of the enumerated steps may be omitted or performed in a different order.

At step 1010, the BS transmits a BWP hopping reconfiguration (e.g., the BWP hopping reconfiguration 820) to a UE (e.g., the UEs 115 and UE 400) requesting the UE to switch from a first BWP hopping pattern (e.g., the frequency hopping pattern 604) to a second BWP hopping pattern (e.g., the frequency hopping pattern 804).

At step 1020, the BS transmits a scheduling grant to the UE. The scheduling grant may be a DL scheduling grant or a UL scheduling grant.

At step 1030, after transmitting the scheduling grant to the UE, the BS starts a timer. The BS may configure the timer with a certain timeout duration.

At step 1040, the BS determines whether the timer has expired. If the timer has expired, the method 1000 proceeds to step 1050. At step 1050, the BS performs a fallback to the first BWP hopping pattern.

If the timer has not expired, the method 1000 proceeds to step 1060. At step 1060, the BS determines whether the UE has responded to the scheduling grant. If the UE has responded to the scheduling grant (e.g., by transmitting a UL communication according to the scheduling grant), the method 1000 proceeds to step 1070 and stops the timer. If the BS assigns another UL scheduling grant to the UE, the BS may restart the timer and repeats the steps 1040-1070. If at step 1060, the BS did not receive a response from the UE, the method 1000 returns to step 1040 and continue to monitor for a response from the UE before the timer expires.

In some aspects, a BS (e.g., the BSs 105 and 500) and a UE (e.g., the UEs 115 and 400) may implement the scheme 800 described above for BWP hopping reconfiguration. In conjunction, the BS may implement the method 1000 and the UE may implement the method 900 in case the BWP hopping reconfiguration causes the BS and the UE to fail to communicate with each other due to certain interference changes.

Figure 11:
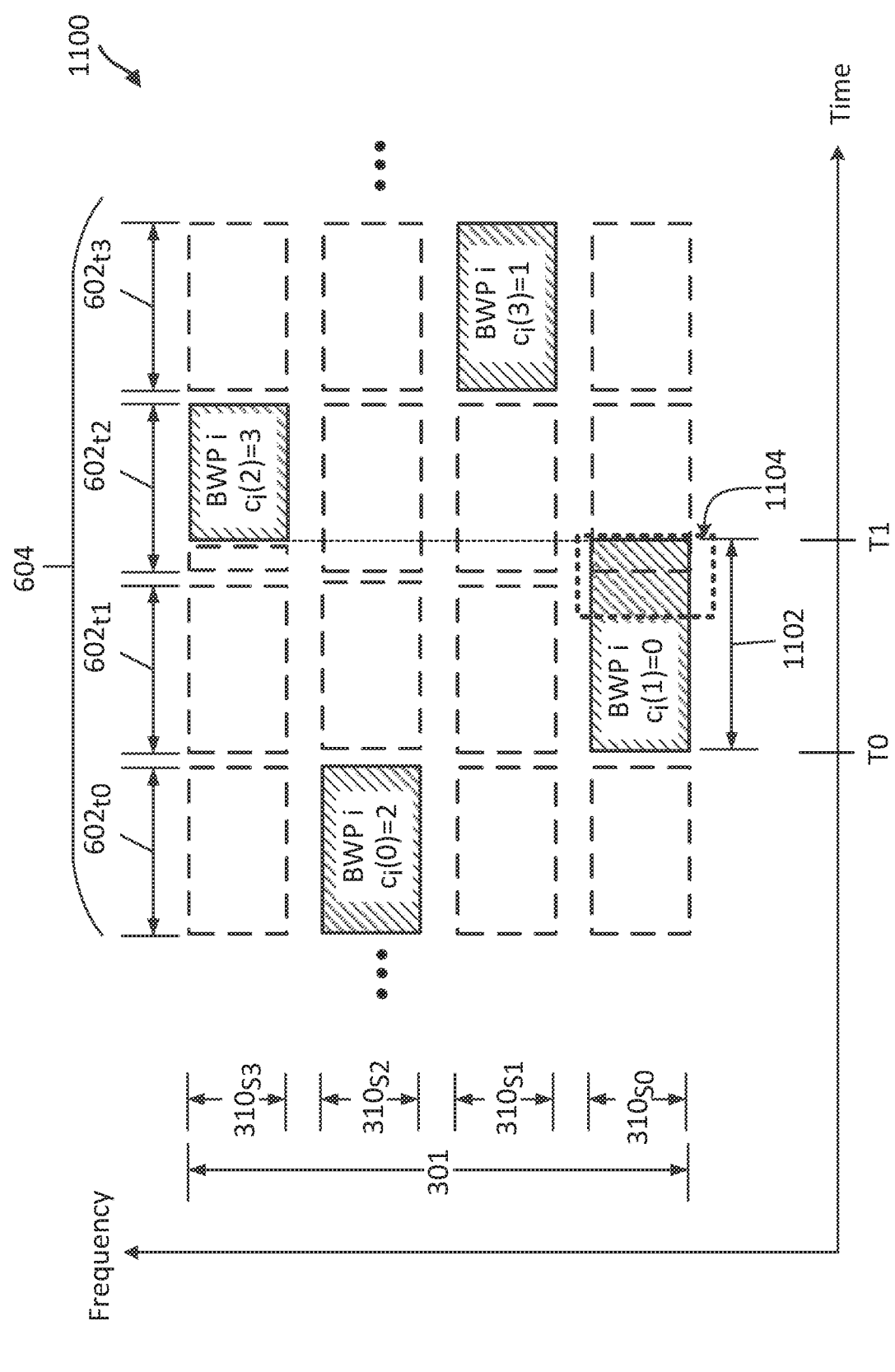
FIG. 11 illustrates a BWP hopping scheme according to some aspects of the present disclosure.
Figure 12:
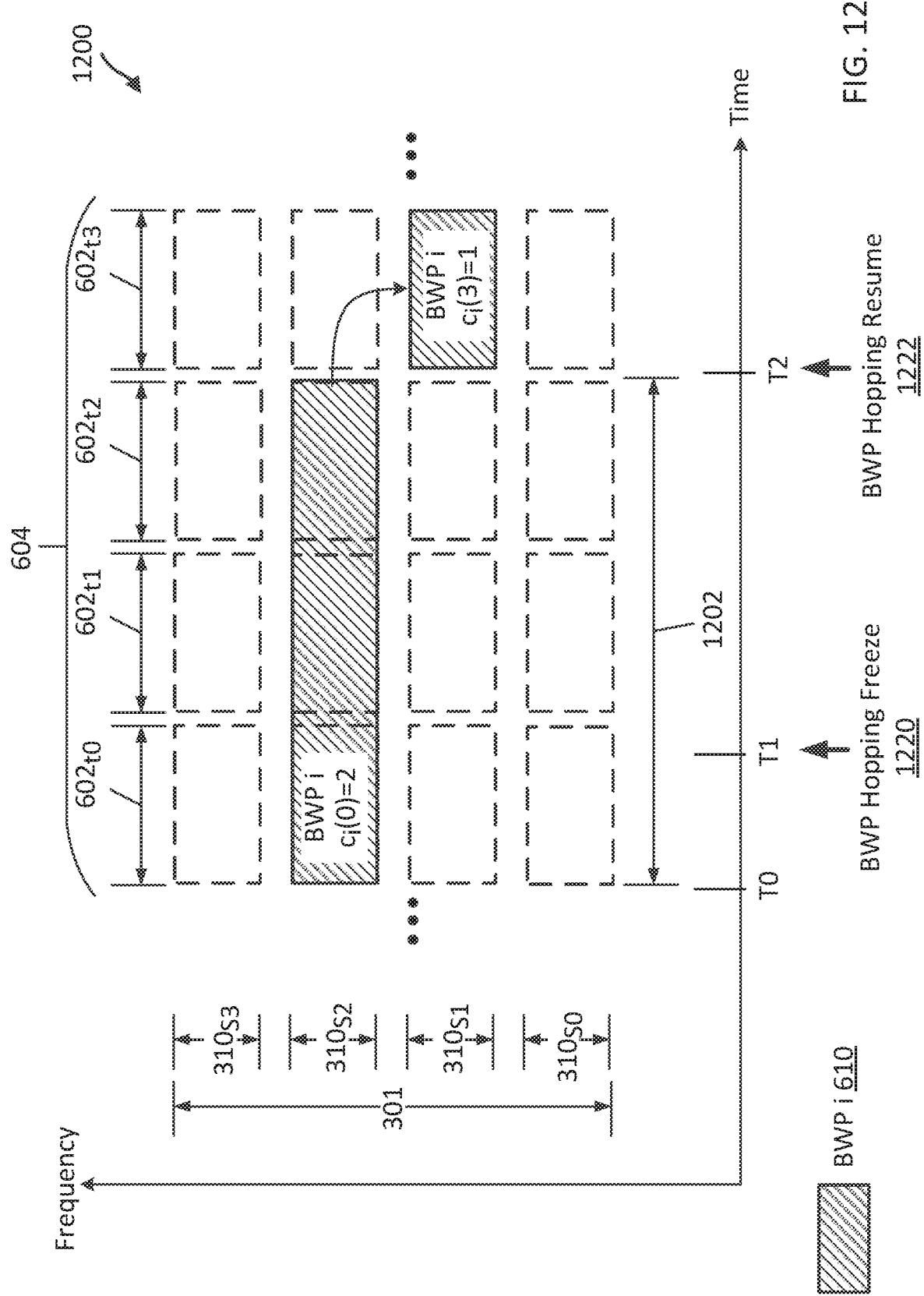
FIG. 12 illustrates a BWP hopping scheme according to some aspects of the present disclosure.

As described above, to perform BWP hopping, a UE (e.g., the UEs 115 and 400) may be required to reconfigure a frontend of the UE to switch from one subband (e.g., the subband 310) to another subband. The tuning to the new subband may require a certain amount of time. Thus, BWP hopping may cause certain overhead at the UE and a gap in communications between the UE and a serving BS (e.g., the BSs 105 and BS 500). Thus, in some instances, it may be advantageous for the UE to remain in a certain subband if the subband can provide a good channel condition or is free of interference. FIGS. 11 and 12 illustrate various mechanisms to provide a BS with flexibility in directing a UE to stay on a certain subband (e.g., the subband 310) for a longer duration than a configured dwell time for the subband or hop.

FIG. 11 illustrates a BWP scheme 1100 hopping according to some aspects of the present disclosure. The scheme 1100 is described using the frequency hopping pattern 604 shown in the scheme 600, and may use the same reference numerals as in FIG. 6 for simplicity's sake. In some aspects, the BS may gain several COTs within a hop in a certain subband 310. The last COT in the subband 310 can potentially extend beyond the dwell time configured for the subband 310. The scheme 1100 allows a BS (e.g., the BSs 105 and BS 500) to continue to communicate with a UE in a subband 310 outside of a dwell time for the corresponding subband 310 before hopping to the next subband 310.

At time T0, the UE may perform BWP hopping to switch from the subband $310_{S2}$ to the subband $310_{S0}$. The BS may perform an LBT (e.g., the LBT 320) in the subband $310_{S0}$ to acquire a COT in the subband $310_{S0}$. For example, the BS may acquire a COT 1104 in the subband $310_{S0}$ at a later time within the duration $602_{t1}$ configured for the hop in the subband $310_{S0}$. After acquiring the COT 1104, the BS may schedule the UE for UL and/or DL communications in the subband $310_{S0}$. In some instances, prior to transmitting a scheduling grant, the BS may transmit a COT indication signal to indicate to the UE that the BS had acquired the COT 1104. The COT indication signal may a duration (e.g., x ms) of the COT 1104. The COT indication signal may indicate that the COT 1104 extends beyond the preconfigured duration $602_{t1}$ for the current hop. The COT indication signal may signal to the UE to delay BWP hopping until the end of the COT 1104. The Since the BS had already gained the COT 1104 in the cleared subband $310_{S0}$, the BS may continue to use the COT 1104 for communications with the UE extending beyond the configured duration $602_{t1}$ instead of wasting the last portion of the COT 1104. As shown, the BWP i 610 may remain in the subband $310_{S1}$ for a duration 1102 until time T1 when the COT 1104 ends. As can be seen, the duration 1102 extends into a portion of the duration $602_{t2}$ configured for the next hop in the subband $310_{S3}$.

At time T1, after the COT 1104 ends, the UE may continue with the BWP hopping to switch from the subband $310_{S0}$ to the subband $310_{S3}$ according to the frequency hopping pattern. In other words, the BWP hopping from the subband $310_{S0}$ to the subband $310_{S3}$ can be delayed till the end of the COT 1104. Since the duration 1102 includes a time period within the duration $602_{t2}$, the UE may remain in the subband $310_{S3}$ for a shorter duration than the dwell time or duration $602_{t2}$ configured for the subband $310_{S3}$.

FIG. 12 illustrates a BWP scheme 1200 hopping according to some aspects of the present disclosure. The scheme 1200 is described using the frequency hopping pattern 604 shown in the scheme 600, and may use the same reference numerals as in FIG. 6 for simplicity's sake. In the scheme 1200, a BS (e.g., the BSs 105 and BS 500) may request a UE to freeze or stop a BWP hopping and/or resume a BWP hopping after a BWP hopping freeze.

At time T0, the BS and the UE may be communicating UL and/or DL communications over the subband $310_{S2}$. As described above, the UE may provide the BS with channel measurements and/or statuses (e.g., via UCI) of the subband $310_{S2}$ and the BS may evaluate interference in the subband $310_{S2}$ based on the reports and/or other measurements performed by the BS. If the channel condition is sufficiently good or clean with little interference or no interference, the BS may request the UE to stay on the current subband $310_{S2}$ to save hopping cost or BWP switching overhead.

For example, at time T1 before the end of the dwell time $602_{t0}$, the BS transmits a BWP hopping freeze instruction 1220 to the UE requesting the UE to remain in the current subband $310_{S2}$. The BS and the UE may continue to communicate in the current subband $310_{S2}$ for any suitable duration as determined by the BS. As an example, the BS may determine to freeze the BWP hopping in the subband $310_{S2}$ for a duration 1202 until time T2.

At time T2, the BS transmits a BWP hopping resume instruction 1222 to the UE requesting the UE to resume BWP hopping. The next hopping frequency may be determined by the running frequency hopping pattern 604. As shown, the BWP hopping freeze duration 1202 includes the next two hop durations $602_{t1}$ and $602_{t2}$ for the subbands $310_{S0}$ and $310_{S3}$, respectively. Thus, upon receiving the BWP hopping resume instruction 1222, the UE skips the next two hops to the subbands $310_{S0}$ and $310_{S3}$ and performs BWP hopping to the subband $310_{S1}$.

In some aspects, the BS may signal the BWP hopping freeze instruction 1220 and/or the BWP hopping resume instruction 1222 via BWP switching DCI signaling, UE-specific DCI signaling, G-DCI signaling, MAC CE signaling, and/or RRC configuration signaling.

As described above, interference is unpredictable and may hop from one subband (e.g., the subbands 310) to another subband. As such, the BS and/or the UE may potentially fail to gain access to the current subband $310_{S2}$ after the BS requested the UE to freeze and remain in the current subband $310_{S2}$. Additionally, in some instances, the UE may miss detect the BWP hopping resume instruction 1222. To avoid being stuck in the current subband $310_{S2}$ when the current subband $310_{S2}$ is no longer clean or the UE missing the BWP hopping instructions 1222, FIGS. 13 and 14 illustrate various timer-based mechanisms to address such scenarios.

FIG. 13 is a flow diagram of a communication method 1300 according to some aspects of the present disclosure. Steps of the method 1300 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the BWP hopping module 408, the communication module 409, the transceiver 410, the modem 412, and the one or more antennas 416, to execute the steps of method 1300. The method 1300 may employ in conjunction with the scheme 1200 described above with respect to FIG. 12. As illustrated, the method 1300 includes a number of enumerated steps, but embodiments of the method 1300 include additional steps before, after, and in between the enumerated steps. In some embodiments, one or more of the enumerated steps may be omitted or performed in a different order.

Generally speaking, the method 1300 includes features similar to method 900 in many respects. For example, steps 1320, 1330, and 1350 are similar to steps 920, 930, and 950, respectively. Accordingly, for sake of brevity, details of those steps will not be repeated here. Please refer to the corresponding descriptions above.

At step 1310, the UE performs a BWP hopping freeze in a current subband (e.g., the subband $310_{S2}$) without hopping to a next BWP hop according to a frequency hopping pattern (e.g., the frequency hopping patter 604 or 804). In this regard, the UE may have received a BWP hopping freeze instruction (e.g., the BWP hopping freeze instruction 1220) from a BS (e.g., the BS 105 or BS 500).

At step 1320, the UE starts a timer to monitor whether the UE receives any communication (e.g., DCI) from the BS in the current subband. If at step 1340, the timer expires and the UE hasn't receive any DCI successfully from the BS, the UE may resume the BWP hopping.

FIG. 14 is a flow diagram of a communication method 1400 according to some aspects of the present disclosure. Steps of the method 1400 can be executed by a computing device (e.g., a processor, processing circuit, and/or other suitable component) of a wireless communication device or other suitable means for performing the steps. For example, a wireless communication device, such as the BS 105 or BS 500, may utilize one or more components, such as the processor 502, the memory 504, the BWP hopping module 508, the communication module 509, the transceiver 510, the modem 512, and the one or more antennas 516, to execute the steps of method 1000. The method 1400 may employ in conjunction with the scheme 1200 described above with respect to FIG. 12. As illustrated, the method 1400 includes a number of enumerated steps, but embodiments of the method 1400 include additional steps before, after, and in between the enumerated steps. In some embodiments, one or more of the enumerated steps may be omitted or performed in a different order.

Generally speaking, the method 1400 includes features similar to method 1000 in many respects. For example, steps 1420, 1430, 1440, 1460, and 1470 are similar to steps 1020, 1030, 1040, 1060, and 1070, respectively. Accordingly, for sake of brevity, details of those steps will not be repeated here. Please refer to the corresponding descriptions above.

At step 1410, the BS transmits a BWP hopping freeze instruction (e.g., the BWP hopping freeze instruction 1220) to a UE (e.g., the UEs 115 and UE 400) requesting the UE to remain in a current subband (e.g., the subband $310_{S2}$) without hopping to a next hop according to a frequency hopping pattern (e.g., the frequency hopping pattern 604 or 804).

At step 1420, the BS transmits a scheduling grant to the UE. The scheduling grant may be a DL scheduling grant or a UL scheduling grant.

At step 1430, after transmitting the scheduling grant to the UE, the BS starts a timer to monitor whether the UE responds to the scheduling grant. If at step 1450, the timer expires and the UE hasn't responded to the scheduling grant, the BS may resume the BWP hopping.

In some aspects, a BS (e.g., the BSs 105 and 500) and a UE (e.g., the UEs 115 and 400) may implement the scheme 1200 described above for BWP hopping freeze in a certain subband (e.g., the subband $310_{S2}$). In conjunction, the BS may implement the method 1400 and the UE may implement the method 1300 in case the BS and the UE to fail to communicate with each other in the current subband due to certain interference changes in the current subband.

Figure 15:
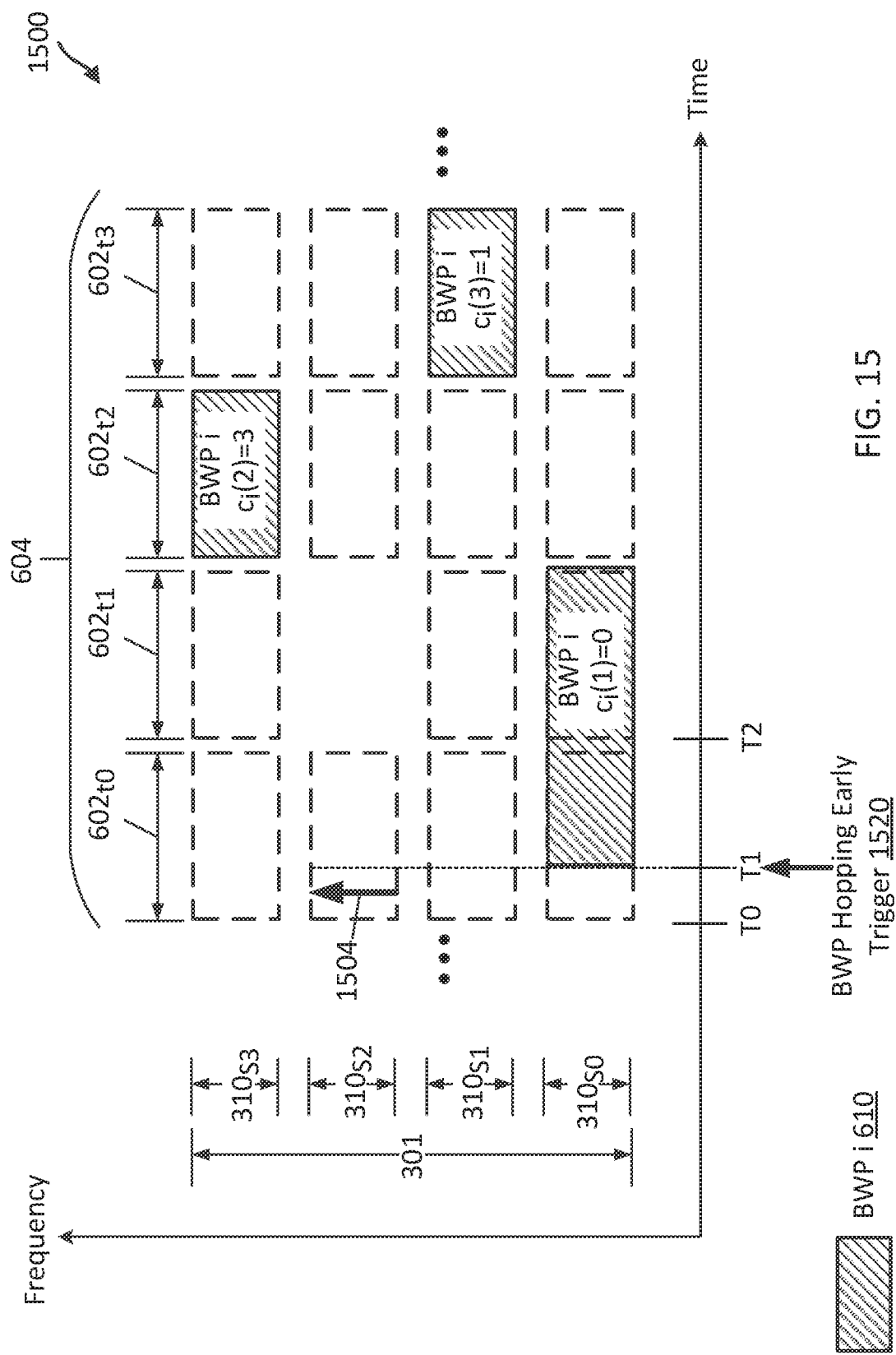
FIG. 15 illustrates a BWP hopping scheme according to some aspects of the present disclosure.

FIG. 15 illustrates a BWP hopping scheme 1500 hopping according to some aspects of the present disclosure. The scheme 1500 is described using the frequency hopping pattern 604 shown in the scheme 600, and may use the same reference numerals as in FIG. 6 for simplicity's sake. Since interference may hop around from one subband 310 to another subband 310, in some instances, the BS may fail to gain access to a certain subband 310 at the beginning of a dwell time or for the subbband. The scheme 1500 allows a BS (e.g., the BSs 105 and 500) to trigger a UE (e.g., the UEs 115 and/or 400) to hop to a next subband in the preconfigured frequency hopping pattern 604 at an earlier time instead of waiting till the of the current dwell time.

At time T0, the UE may be tuned to the subband $310_{S2}$ based on the frequency hopping pattern 604. The BS may detect interference 1504 in the subband $310_{S2}$ via channel measurements and/or channel reports received from the UE or another UE. At time T1, upon detecting the presence of the interference 1504 in the subband $310_{S2}$, the BS transmits a BWP hopping early trigger 1520 to the UE requesting the UE to hop to a next subband in the preconfigured frequency hopping pattern 604 at an earlier time.

Upon receiving the BWP hopping early trigger 1520, the UE perform BWP hopping to switch from the subband to a next subband $310_{S0}$ in the preconfigured frequency hopping pattern 604 instead of waiting till the end of the dwell time $602_{r0}$ to switch to the subband $310_{S0}$.

In some instances, the interference may cause the UE to miss detect the BWP hopping early trigger 1520. If the UE miss detects the BWP hopping early trigger 1520, the UE may remain in the subband $310_{S2}$ until the end of the dwell time $602_{r0}$ and switch to the subband $310_{S0}$ at time T2. After the switch, the BS and the UE may be in-sync again.

In some aspects, the BS may signal the BWP hopping early trigger 1520 via BWP switching DCI signaling, UE-specific DCI signaling, G-DCI signaling, MAC CE signaling, and/or RRC configuration signaling. The G-DCI signaling may be used to migrate a group of UEs from one subband 310 to another subband 310 following the frequency hopping pattern 604.

Figure 16:
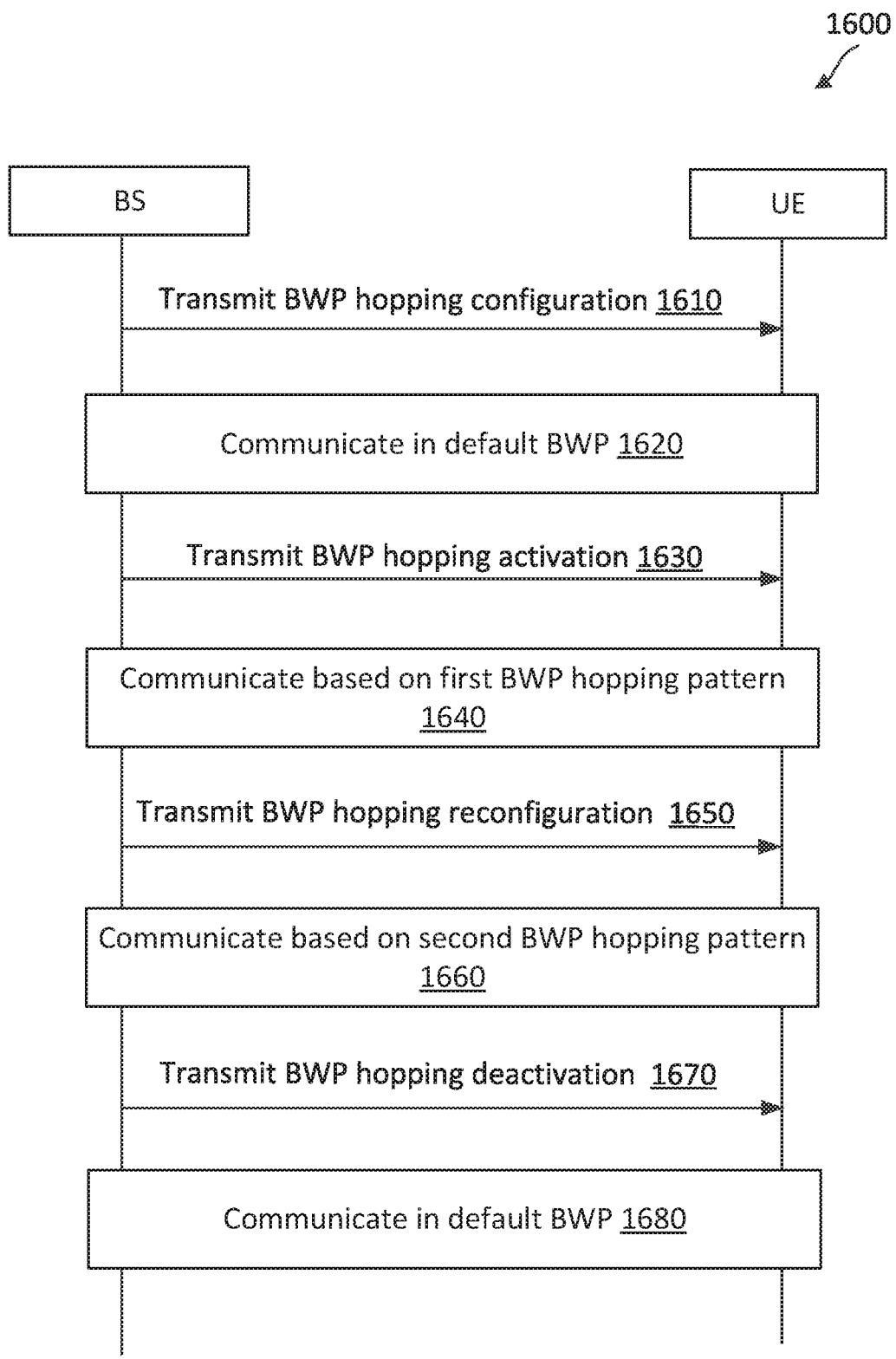
FIG. 16 is a signaling diagram illustrating a BWP hopping method according to some aspects of the present disclosure.

FIG. 16 is a signaling diagram illustrating a BWP hopping method 1600 according to some aspects of the present disclosure. The method 1600 may be implemented between a BS (e.g., BSs 105 and/or 500) and a UE (e.g., UEs 115 and/or 400). The UE may be a narrowband UE. The method 1600 may be implemented after the BS establishes an RRC connection with the UE in a default BWP (e.g., in one of the subbands 310). The method 1400 may employ similar mechanisms as in the schemes 600, 700, 800, 1100, 1200, 1500 described above with respect to FIGS. 6, 7, 8, 11, 12, and 15, respectively, and/or the methods 900, 1000, 1300, and/or 1400 described above with respect to FIGS. 9, 10, 13, and/or 14, respectively. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the BS transmits a BWP hopping configuration to the UE. The BWP hopping configuration may indicate one or more BWP hopping patterns (e.g., the frequency hopping patterns 604 and 804) for a plurality of BWPs. Each BWP may be within a subband (e.g., the subbands 310) of a shared frequency band or an unlicensed band (e.g., the frequency band 301). The BWP hopping patterns (e.g., BWP hopping patterns 604 and/or 804) may be determined based on a predetermined sequence (e.g., c(k) as discussed above with respect to FIG. 6). The BWP hopping configuration may indicate a dwell time or BWP hop duration (e.g., durations 602 and 802) for each hop in the frequency patterns.

At step 1620, the BS communicates with the UE in the default BWP. The BS may schedule the UE for UL communications (e.g., PUCCH and PUSCH) and/or DL communications (e.g., PDCCH and PDSCH). The UE may monitor for scheduling information (e.g., PDCCH scheduling grants) from the BS and communicate with the UE accordingly. The UE may report channel statuses and/or interference measurements to the BS (e.g., via PUCCH). The BS may evaluate interference based on channel reports received from the UE and/or other channel measurements in the default BWP.

At step 1630, the BS transmits a BWP hopping activation (e.g., the BWP hopping activation 620) to the UE requesting the UE to activate a first preconfigured BWP hopping pattern indicated in the BWP hopping configuration. The activation may be based on the interference evaluation.

At step 1640, the BS communicates with the UE based on the first BWP hopping pattern. In this regard, the BS may perform LBTs (e.g., the LBTs 320) by hopping around the subbands according to the first BWP hopping pattern and may schedule the UE for communications based on the LBTs. The UE may monitor for scheduling information from the BS by hopping around the subbands according to the first BWP hopping pattern. The UE may report channel statuses and/or interference measurements to the BS. The BS may evaluate interference based on channel reports received from the UE and/or other channel measurements.

At step 1650, the BS transmits a BWP hopping reconfiguration (e.g., the BWP hopping reconfiguration 820) to the UE requesting the UE to use a different BWP hopping pattern, for a second preconfigured BWP hopping pattern indicated in the BWP hopping configuration. The reconfiguration may be based on the interference evaluation and/or for load redistribution.

At step 1660, the BS communicates with the UE based on the second BWP hopping pattern using similar mechanisms as in the step 1640.

At step 1670, the BS transmits a BWP hopping deactivation (e.g., the BWP hopping deactivation 622) to the UE requesting the UE to deactivate BWP hopping. The deactivation may be based on the interference evaluation.

At step 1680, the BS communicates with the UE in the default BWP.

In some instances, the BS may request the reconfiguration multiple times depending on the interference in the subbands and/or traffic loading in the subbands. In some instances, the BS may communicate with the UE in a BWP or subband over a period outside of a corresponding dwell time as shown in the scheme 1100 described above with respect to FIG. 11. In some instances, the BS may request the UE to freeze BWP hopping and remain in a current subband and may subsequently request the UE to resume BWP hopping as shown in the scheme 1200 described above with respect to FIG. 12. In some instances, the BS and the UE may be out-of-sync in terms of BWP hopping and may utilize timer-based mechanisms as shown in the methods 900, 1000, 1300, and/or 1400 described above with respect to FIGS. 9, 10, 13, and/or 14, respectively, to recover from the out-of-sync condition. In some instances, the BS may detect that a subband is impacted by interference and may trigger the UE to perform a BWP hopping at an earlier time than a corresponding hop dwell time via a BWP hopping early trigger (e.g., the BWP hopping early trigger 1520) as shown in the scheme 1500 described above with respect to FIG. 15.

In some aspects, the BS may transmit the BWP hopping configuration via RRC configuration signaling. The BS may transmit the BWP hopping activation, the BWP hopping deactivation, the BWP hopping reconfiguration, the BWP hopping freeze instruction, the BWP hopping resume instruction, and/or the BWP hopping early trigger via dynamic DCI signaling, UE-specific DCI signaling, MAC CE signaling, and/or RRC configuration signaling. In some aspects, the BS may transmit the BWP hopping activation, the BWP hopping deactivation, the BWP hopping reconfiguration, the BWP hopping freeze instruction, the BWP hopping resume instruction, and/or the BWP hopping early trigger to a group of UEs via G-DCI signaling to reduce signaling overhead.

Figure 17:
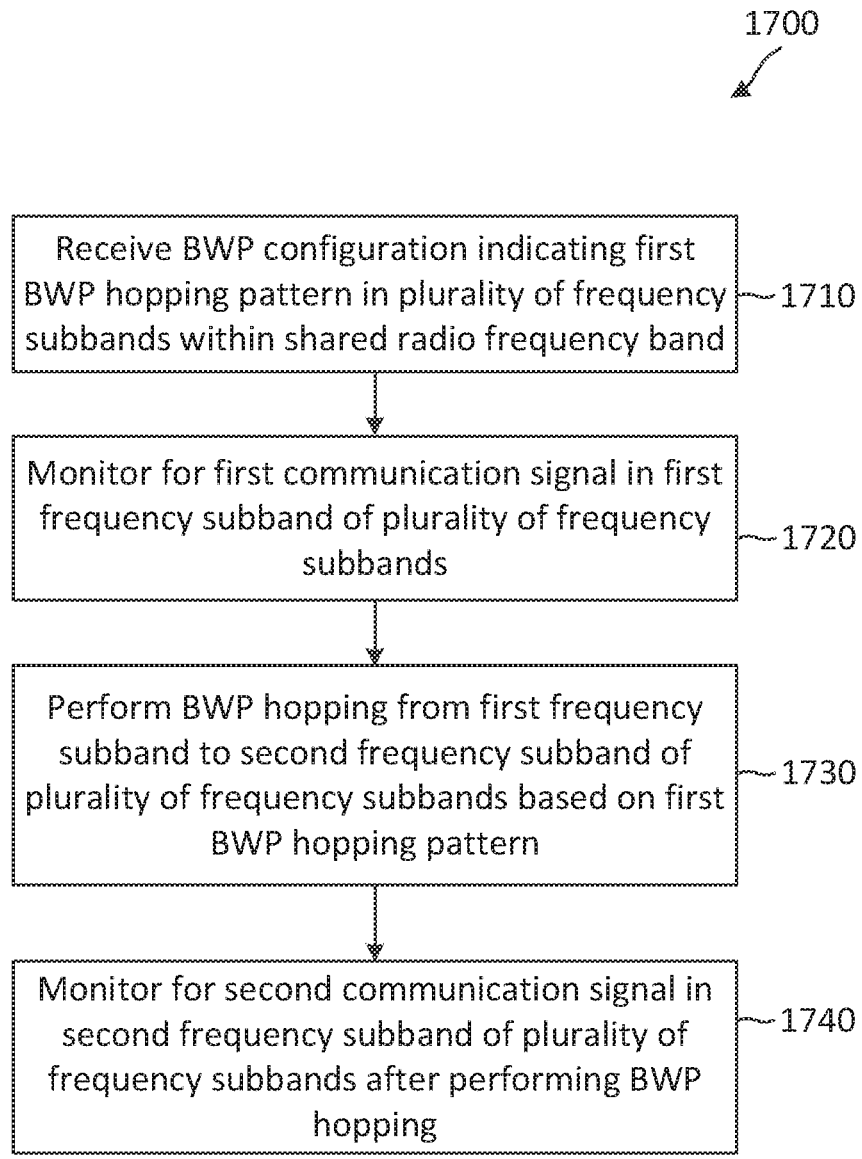
FIG. 17 is a flow diagram of a communication method according to some aspects of the present disclosure.

FIG. 17 is a flow diagram of a communication method 1700 according to some aspects of the present disclosure. Steps of the method 1700 can be executed by a computing device (e.g., a processor, processing circuit, and/or other suitable component) of a wireless communication device or other suitable means for performing the steps. For example, a wireless communication device, such as the UE 115 or the UE 400, may utilize one or more components, such as the processor 402, the memory 404, the BWP hopping module 408, the communication module 409, the transceiver 410, the modem 412, and the one or more antennas 416, to execute the steps of method 1700. The method 1700 may employ similar mechanisms as in the schemes 600, 700, 800, 1100, 1200, and/or 1500 described above with respect to FIGS. 6, 7, 8, 11, 12, and/or 15, respectively, and/or the methods 900, 1000, 1300, 1400, and/or 1600 described above with respect to FIGS. 9, 10, 13, 14, and/or 15, respectively. As illustrated, the method 1700 includes a number of enumerated steps, but embodiments of the method 1700 include additional steps before, after, and in between the enumerated steps. In some embodiments, one or more of the enumerated steps may be omitted or performed in a different order.

At step 1710, the method 1700 includes receiving, by a UE from a BS (e.g., the BSs 105 and 500), a configuration indicating a first BWP hopping pattern (e.g., the frequency hopping patterns 604 and 804) in a plurality of frequency subbands (e.g., the subbands 310) within a shared radio frequency band (e.g., the frequency band 301). Channel access in the shared radio frequency band may be acquired per subband based on LBTs.

At step 1720, the method 1700 includes monitoring, by the UE, for a first communication signal in a first frequency subband of the plurality of frequency subbands.

At step 1730, the method 1700 includes performing, by the UE, BWP hopping from the first frequency subband to a second frequency subband of the plurality of frequency subbands based on the first BWP hopping pattern. In some instances, the performing the BWP hopping includes configuring, by the UE, a frontend (e.g., the RF unit 414) of the UE to switch from the first frequency subband to the second frequency subband.

At step 1740, the method 1700 includes monitoring, by the UE after performing the BWP hopping, for a second communication signal in the second frequency subband. The first and second communication signals may include a COT indication signal, a DL scheduling, grant, and/or a UL scheduling grant, and/or any DL communication signals.

In some instances, the method 1700 includes receiving, by the UE from the BS, a BWP hopping activation (e.g., the BWP hopping activation 620). In some instances, step 1730 is further based on the BWP hopping activation. In some instances, the method 1700 includes receiving, by the UE from the BS, a BWP hopping deactivation (e.g., the BWP hopping deactivation 622). The method 1700 may further include performing, by the UE in response to the BWP hopping deactivation, BWP hopping back to the first frequency subband. The method 1700 may further include monitoring, by the UE, for a third communication signal in the first frequency subband after performing the BWP hopping back to the first frequency subband.

In some instances, the configuration further indicates a second BWP hopping pattern in the plurality of frequency subbands different from the first BWP hopping pattern. In some instances, the first BWP hopping pattern is associated with a first BWP (e.g., the BWP i 610) that begins in the first frequency subband. The second BWP hopping pattern is associated with a second BWP (e.g., the BWP j 810) that begins in a third frequency subband of the plurality of frequency subbands, where the third frequency subband is different from the first frequency subband. In some instances, the method 1700 includes receiving, by the UE from the BS, a BWP hopping reconfiguration (e.g., the BWP hopping reconfiguration 820) indicating to use the second BWP hopping pattern. The method 1700 may further include performing, by the UE, BWP hopping based on the second BWP hopping pattern. In some instances, the method 1700 includes switching, by the UE, from the second BWP hopping pattern to the first BWP hopping pattern based on a timer expiration.

In some instances, the configuration further indicates, for the first BWP hopping pattern, a first BWP hop duration (e.g., the durations 602 and/or 802) for the first frequency subband and a second BWP hop duration for the second frequency subband. In some instances, the method 1700 includes receiving, by the UE from the BS based on the monitoring in the first frequency subband, the first communication signal indicating a COT (e.g., the COT 1104) in the first frequency subband acquired by the BS. The COT includes a period that is outside of the first BWP hop duration and at least partially within the second BWP hop duration. Step 1730 may include delaying, by the UE, the BWP hopping from the first frequency subband to the second frequency subband based on an end time of the COT. In some instances, the method 1700 includes receiving, by the UE from the BS, a BWP hopping freeze instruction (e.g., the BWP hopping freeze instruction 1220) to remain in the first frequency subband after the first BWP hop duration. The method 1700 may further include refraining, by the UE, from performing BWP hopping after the first BWP hop duration based on the BWP hopping freeze instruction. In some instances, the method 1700 includes receiving, by the UE from the BS, a BWP hopping resume instruction (e.g., the BWP hopping freeze instruction 1222). Step 1730 may be further based on the BWP hopping resume instruction. In some instances, the step 1730 may be further based on a timer expiration. In some instances, the method 1700 includes receiving, by the UE from the BS, an instruction (e.g., the BWP hopping early trigger 1520) to hop from a third frequency subband of the plurality of frequency subbands to the first frequency subband before a start of the first BWP hop duration based on a channel detection in the third frequency subband.

In some instances, the first BWP hopping pattern is based on a predetermined sequence (e.g., c(k)). In some instances, the first BWP hopping pattern is based on at least one of a transmission slot index, an identifier of the UE, a cell identifier, a starting BWP index, or a BWP hop dwell duration.

In some instances, the method 1700 includes receiving, by the UE from the BS in the first frequency subband, the first communication signal including data (e.g., the data 710) based on the monitoring in the first frequency subband. The method 1700 may further include transmitting, by the UE to the BS in the second frequency subband, the second communication signal including an ACK/NACK (e.g., the ACK/NACK 712) for the data after performing the BWP hopping to the second subband.

Figure 18:
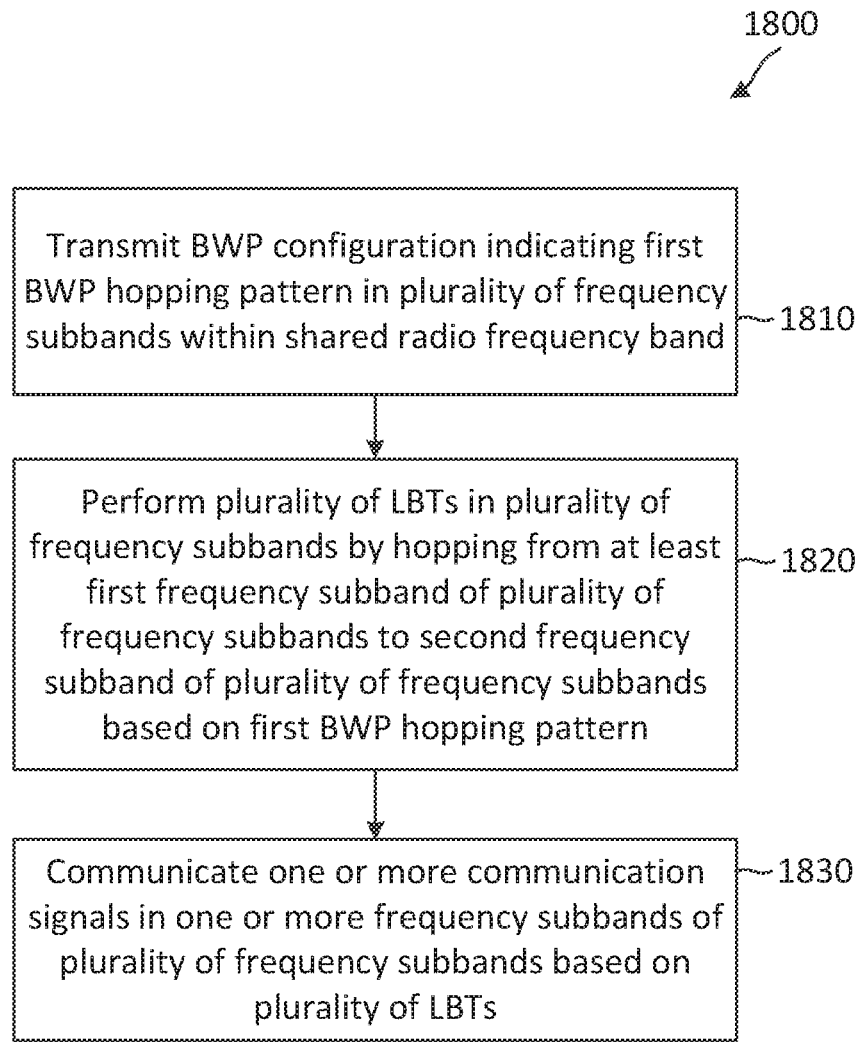
FIG. 18 is a flow diagram of a communication method according to some aspects of the present disclosure.

FIG. 18 is a flow diagram of a communication method 1800 according to some aspects of the present disclosure.

Steps of the method 1800 can be executed by a computing device (e.g., a processor, processing circuit, and/or other suitable component) of a wireless communication device or other suitable means for performing the steps. For example, a wireless communication device, such as the BS 105 or the BS 500, may utilize one or more components, such as the processor 502, the memory 504, the BWP hopping module 508, the communication module 509, the transceiver 510, the modem 512, and the one or more antennas 516, to execute the steps of method 1800. The method 1800 may employ similar mechanisms as in the schemes 600, 700, 800, 1100, 1200, and/or 1500 described above with respect to FIGS. 6, 7, 8, 11, 12, and/or 15, respectively, and/or the methods 900, 1000, 1300, 1400, and/or 1600 described above with respect to FIGS. 9, 10, 13, 14, and/or 15, respectively. As illustrated, the method 1800 includes a number of enumerated steps, but embodiments of the method 1800 include additional steps before, after, and in between the enumerated steps. In some embodiments, one or more of the enumerated steps may be omitted or performed in a different order.

At step 1810, the method 1800 includes transmitting, by a BS to a UE (e.g., the UEs 115 and/or 400), a configuration indicating a first BWP hopping pattern (e.g., the frequency hopping patterns 604 and 804) in a plurality of frequency subbands (e.g., the subbands 310) within a shared radio frequency band (e.g., the frequency band 301).

At step 1820, the method 1800 includes performing, by the BS, a plurality of LBTs (e.g., the LBTs 320) in the plurality of frequency subbands by hopping from at least a first frequency subband of the plurality of frequency subbands to a second frequency subband of the plurality of frequency subbands based on the first BWP hopping pattern. Channel access in the shared radio frequency band may be per subband based on the LBTs.

At step 1830, the method 1800 includes communicating, by the BS with the UE, one or more communications signals in one or more frequency subbands of the plurality of frequency subbands based on the plurality of LBTs.

In some instances, the method 1800 includes transmitting, by the BS to the UE in the first frequency subband, a BWP hopping activation (e.g., the BWP hopping activation 620). In some instances, step 1820 is further based on the BWP hopping activation. In some instances, the method 1800 includes transmitting, by the BS to the UE, a BWP hopping deactivation (e.g., the BWP hopping deactivation 622). The method 1800 further includes performing, by the BS, a second LBT in the first frequency subband by hopping back to the first frequency subband based on the BWP hopping deactivation. In some instances, the transmitting the BWP hopping activation includes transmitting, by the BS to a group of UEs including the UE in the first frequency subband, the BWP hopping activation. In some instances, the method further includes transmitting, by the BS to the group of UEs, a BWP hopping deactivation.

In some instances, the configuration further indicates a second BWP hopping pattern in the plurality of frequency subbands different from the second BWP hopping pattern. In some instances, the first BWP hopping pattern is associated with a first BWP (e.g., the BWP i 610) that begins in the first frequency subband. The second BWP hopping pattern is associated with a second BWP (e.g., the BWP j 810) that begins in a third frequency subband of the plurality of frequency subbands, where the third frequency subband is different from the first frequency subband. In some instances, the method 1800 includes transmitting, by the BS to the UE, a BWP hopping reconfiguration (e.g., the BWP hopping reconfiguration 820) indicating to use the second BWP hopping pattern. The method 1800 may further include performing, by the BS, a plurality of second LBTs in the plurality of frequency subbands based on the second BWP hopping pattern. In some instances, the method 1800 includes switching, by the BS, from the second BWP hopping pattern to the first BWP hopping pattern based on a timer expiration.

In some instances, the configuration further indicates, for the first BWP hopping pattern, a first BWP hop duration (e.g., the durations 602 and/or 802) for the first frequency subband and a second BWP hop duration for the second frequency subband. In some instances, the method 1800 includes acquiring, by the BS, a COT (e.g., the COT 1104) in the first frequency subband, where the COT includes a period that is outside of the first BWP hop duration and at least partially within the second BWP hop duration. The step 1830 may further include communicating, by the BS with the UE, a first communication signal in the first frequency subband during the period that is outside of the first BWP hop duration and at least partially within the second BWP hop duration. In some instances, the method 1800 includes transmitting, by the BS to the UE, a BWP hopping freeze instruction (e.g., the BWP hopping freeze instruction 1220) to remain in the first frequency subband after the first BWP hop duration. In some instances, the communicating the first communication signal in the first frequency subband during a period outside of the first BWP hop duration is further based on the BWP hopping freeze instruction. In some instances, the method 1800 includes transmitting, by the BS to the UE, a BWP hopping resume instruction (e.g., the BWP hopping freeze instruction 1222). In some instances, step 1820 includes performing, by the BS, an LBT in the second frequency subband after hopping from the first frequency subband to the second frequency subband based on the BWP hopping resume instruction. In some instances, step 1820 includes performing, by the BS, an LBT in the second frequency subband after hopping from the first frequency subband to the second frequency subband based on a timer expiration. In some instances, the transmitting BWP hopping freeze instruction includes transmitting, by the BS to a group of UEs including the UE, the BWP hopping freeze instruction. In some instances, the method 1800 further includes transmitting, by the BS to the group of UEs, a BWP hopping resume instruction. In some instances, the method 1800 includes transmitting, by the BS to the UE, an instruction (e.g., the BWP hopping early trigger 1520) to hop from a third frequency subband of the plurality of frequency subbands to the first frequency subband before a start of the first BWP hop duration based on a channel detection in the third frequency subband. In some instances, the transmitting the instruction to hop from the third frequency subband to the first frequency subband before the start of the first BWP hop duration includes transmitting, by the BS to a group of UEs including the UE, the instruction to hop from the third frequency subband to the first frequency subband before the start of the BWP hop first duration.

In some instances, the first BWP hopping pattern is based on a predetermined sequence (e.g., c(k)). In some instances, the first BWP hopping pattern is based on at least one of a transmission slot index, an identifier of the UE, a cell identifier, a starting BWP index, or a BWP hop dwell duration.

In some instances, the step 1830 includes transmitting, by the BS to the UE in the first frequency subband, a first communication signal including data (e.g., the data 710).

The step 1830 may further include receiving, by the BS from the UE in the second frequency subband, a second communication signal including an ACK/NACK (e.g., the ACK/NACK 712) for the data.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication. The method includes receiving, by a user equipment (UE) from a base station (BS), a bandwidth part (BWP) configuration indicating a first BWP hopping pattern in a plurality of frequency subbands within a shared radio frequency band. The method of wireless communication also includes monitoring, by the UE, for a first communication signal in a first frequency subband of the plurality of frequency subbands. The method of wireless communication also includes performing, by the UE, BWP hopping from the first frequency subband to a second frequency subband of the plurality of frequency subbands based on the first BWP hopping pattern. The method of wireless communication also includes monitoring, by the UE after performing the BWP hopping, for a second communication signal in the second frequency subband.

In some aspect, the method may also include one or more of the following features. For instance, the method may include performing, by the UE, a first listen-before-talk (LBT) in the first frequency subband; and performing, by the UE, a second LBT in the second frequency subband. The performing the BWP hopping is further based on the BWP hopping activation. The method may include receiving, by the UE from the BS, a BWP hopping deactivation; performing, by the UE in response to the BWP hopping deactivation, BWP hopping back to the first frequency subband; and monitoring, by the UE, for a third communication signal in the first frequency subband after performing the BWP hopping back to the first frequency subband. The configuration further indicates a second BWP hopping pattern in the plurality of frequency subbands different from the first BWP hopping pattern. The first BWP hopping pattern is associated with a first BWP that begins in the first frequency subband, and where the second BWP hopping pattern is associated with a second BWP that begins in a third frequency subband of the plurality of frequency subbands different from the first frequency subband. The method may include receiving, by the UE from the BS, a BWP hopping reconfiguration indicating to use the second BWP hopping pattern; and performing, by the UE, BWP hopping based on the second BWP hopping pattern. The method may include switching, by the UE, from the second BWP hopping pattern to the first BWP hopping pattern based on a timer expiration. The configuration further indicates, for the first BWP hopping pattern, a first BWP hop duration in the first frequency subband and a second BWP hop duration in the second frequency subband. The performing the BWP hopping includes delaying, by the UE, the BWP hopping from the first frequency subband to the second frequency subband based on an end time of the COT. The method may include receiving, by the UE from the BS, a BWP hopping freeze instruction to remain in the first frequency subband after the first BWP hop duration; and refraining, by the UE, from performing BWP hopping after the first BWP hop duration based on the BWP hopping freeze instruction. The performing the BWP hopping from the first frequency subband to the second frequency subband is further based on the BWP hopping resume instruction. The performing the BWP hopping from the first frequency subband to the second frequency subband is further based on a timer expiration. The method may include receiving, by the UE from the BS, an instruction to hop from a third frequency subband of the plurality of frequency subbands to the first frequency subband before a start of the first BWP hop duration based on a channel detection in the third frequency subband. The first BWP hopping pattern is based on a predetermined sequence. The first BWP hopping pattern is based on at least one of a transmission slot index, an identifier of the UE, a cell identifier, a starting BWP index, or a BWP hop dwell duration. The method may include receiving, by the UE from the BS in the first frequency subband, the first communication signal including data based on the monitoring in the first frequency subband; and transmitting, by the UE to the BS in the second frequency subband, an acknowledgement/negative-acknowledgement (ACK/NACK) for the data after performing the BWP hopping. The performing the BWP hopping includes configuring, by the UE, a frontend of the UE to switch from the first frequency subband to the second frequency subband.

Further embodiments of the present disclosure include a method of wireless communication. The method includes transmitting, by a base station (BS) to a user equipment (UE), a bandwidth part (BWP) configuration indicating a first BWP hopping pattern in a plurality of frequency subbands within a shared radio frequency band. The method of wireless communication also includes performing, by the BS, a plurality of listen-before-talks (LBTs) in the plurality of frequency subbands by hopping from at least a first frequency subband of the plurality of frequency subbands to a second frequency subband of the plurality of frequency subbands based on the first BWP hopping pattern. The method of wireless communication also includes communicating, by the BS with the UE, one or more communications signals in one or more frequency subbands of the plurality of frequency subbands based on the plurality of LBTs.

In some aspects, the method may also include one or more of the following features. For instance, the method includes where the performing includes performing, by the BS, a first LBT of the plurality of LBTs, in the first frequency subband; and performing, by the BS, a second LBT of the plurality of LBTs, in the second frequency subband. The performing the plurality of LBTs is further based on the BWP hopping activation. The method may include transmitting, by the BS to the UE, a BWP hopping deactivation; and performing, by the BS, a second LBT in the first frequency subband by hopping back to the first frequency subband based on the BWP hopping deactivation. The transmitting the BWP hopping activation includes transmitting, by the BS to a group of UEs including the UE in the first frequency subband, the BWP hopping activation. The method may include transmitting, by the BS to the group of UEs, a BWP hopping deactivation. The configuration further indicates a second BWP hopping pattern in the plurality of frequency subbands different from the first BWP hopping pattern. The first BWP hopping pattern is associated with a first BWP that begins in the first frequency subband, and where the second BWP hopping pattern is associated with a second BWP that begins in a third frequency subband of the plurality of frequency subbands different from the first frequency subband. The method may include transmitting, by the BS to the UE, a BWP hopping reconfiguration indicating to use the second BWP hopping pattern; and performing, by the BS, another plurality of LBTs in the plurality of frequency subbands based on the second BWP hopping pattern. The method may include switching, by the BS, from the second BWP hopping pattern to the first BWP hopping pattern based on a timer expiration. The configuration further indicates, for the first BWP hopping pattern, a first BWP hop duration in the first frequency subband and a second BWP hop duration in the second frequency subband. The communicating the one or more communication signals include communicating, by the BS with the UE, a first communication signal in the first frequency subband during the period that is at least partially within the second BWP hop duration. The performing the plurality of LBTs include performing, by the BS, a second LBT of the plurality of LBTs in the first frequency subband during the second BWP hop duration for the second frequency subband based on the BWP hopping freeze instruction. The performing the plurality of LBTs includes performing, by the BS, a first LBT of the plurality of LBTs in the second frequency subband after hopping from the first frequency subband to the second frequency subband based on the BWP hopping resume instruction. The performing the plurality of LBTs includes performing, by the BS, a first LBT of the plurality of LBTs in the second frequency subband after hopping from the first frequency subband to the second frequency subband based on a timer expiration. The transmitting the BWP hopping freeze instruction includes transmitting, by the BS to a group of UEs including the UE, the BWP hopping freeze instruction. The method may include transmitting, by the BS to the group of UEs, a BWP hopping resume instruction. The method may include transmitting, by the BS to the UE, an instruction to hop from a third frequency subband of the plurality of frequency subbands to the first frequency subband before a start of the first BWP hop duration based on a channel detection in the third frequency subband. The transmitting the instruction to hop from the third frequency subband to the first frequency subband before the start of the first BWP hop duration includes transmitting, by the BS to a group of UEs including the UE, the instruction to hop from the third frequency subband to the first frequency subband before the start of the first BWP hop duration. The first BWP hopping pattern is based on a predetermined sequence. The first BWP hopping pattern is based on at least one of a transmission slot index, an identifier of the UE, a cell identifier, a starting BWP index, or a BWP hop dwell duration. The communicating the one or more communication signals includes transmitting, by the BS to the UE in the first frequency subband, a first communication signal including data; and receiving, by the BS from the UE in the second frequency subband, a second communication signal including an acknowledgement/negative-acknowledgement (ACK/NACK) for the data.

Further embodiments of the present disclosure include a user equipment (UE) includes a transceiver configured to receive, from a base station (BS), a bandwidth part (BWP) configuration indicating a first BWP hopping pattern in a plurality of frequency subbands within a shared radio frequency band; and a processor configured to monitor for a first communication signal in a first frequency subband of the plurality of frequency subbands; perform BWP hopping from the first frequency subband to a second frequency subband of the plurality of frequency subbands based on the first BWP hopping pattern; and monitor, after performing the BWP hopping, for a second communication signal in the second frequency subband.

In some aspects, the UE may also include one or more of the following features. For instance, The UE includes where the processor is further configured to perform a first listen-before-talk (LBT) in the first frequency subband; and perform a second LBT in the second frequency subband. The transceiver is further configured to receive, from the BS, a BWP hopping activation; and the processor configured to perform the BWP hopping is further configured to perform the BWP based on the BWP hopping activation. The transceiver is further configured to receive, from the BS, a BWP hopping deactivation; and where the performing, by the UE in response to the BWP hopping deactivation, BWP hopping back to the first frequency subband; and the processor is further configured to monitor for a third communication signal in the first frequency subband after performing the BWP hopping back to the first frequency subband. The configuration further indicates a second BWP hopping pattern in the plurality of frequency subbands different from the first BWP hopping pattern. The first BWP hopping pattern is associated with a first BWP that begins in the first frequency subband, and where the second BWP hopping pattern is associated with a second BWP that begins in a third frequency subband of the plurality of frequency subbands different from the first frequency subband. The transceiver is further configured to receive, from the BS, a BWP hopping reconfiguration indicating to use the second BWP hopping pattern; and the processor is further configured to perform BWP hopping based on the second BWP hopping pattern. The processor is further configured to switch from the second BWP hopping pattern to the first BWP hopping pattern based on a timer expiration. The configuration further indicates, for the first BWP hopping pattern, a first BWP hop duration in the first frequency subband and a second BWP hop duration in the second frequency subband. The transceiver is further configured to receive, from the BS based on the monitoring in the first frequency subband, the first communication signal indicating a channel occupancy time (COT) in the first frequency subband acquired by the BS, the COT including a period that is outside of the first BWP hop duration and at least partially within the second BWP hop duration; and the processor configured to perform the BWP hopping is further configured to delay the BWP hopping from the first frequency subband to the second frequency subband based on an end time of the COT. The transceiver is further configured to receive, from the BS, a BWP hopping freeze instruction to remain in the first frequency subband after the first BWP hop duration; and the processor is further configured to refrain from performing BWP hopping after the first BWP hop duration based on the BWP hopping freeze instruction. The transceiver is further configured to receive, from the BS, a BWP hopping resume instruction; and the processor configured to perform the BWP hopping is further configured to perform the BWP hopping from the first frequency subband to the second frequency subband further based on the BWP hopping resume instruction. The processor configured to perform the BWP hopping is further configured to perform the BWP hopping from the first frequency subband to the second frequency subband further based on a timer expiration. The transceiver is further configured to receive, from the BS, an instruction to hop from a third frequency subband of the plurality of frequency subbands to the first frequency subband before a start of the first BWP hop duration based on a channel detection in the third frequency subband. The first BWP hopping pattern is based on a predetermined sequence. The first BWP hopping pattern is based on at least one of a transmission slot index, an identifier of the UE, a cell identifier, a starting BWP index, or a BWP hop dwell duration. The transceiver is further configured to receive, from the BS in the first frequency subband, the first communication signal including data based on the monitoring in the first frequency subband; and transmit, to the BS in the second frequency subband, an acknowledgement/negative-acknowledgement (ACK/NACK) for the data after performing the BWP hopping. The processor configured to perform the BWP hopping is further configured to configure a frontend of the UE to switch from the first frequency subband to the second frequency subband.

Further embodiments of the present disclosure include a base station (BS) includes a transceiver configured to transmit, to a user equipment (UE), a bandwidth part (BWP) configuration indicating a first BWP hopping pattern in a plurality of frequency subbands within a shared radio frequency band; and communicate, by the BS with the UE, one or more communications signals in one or more frequency subbands of the plurality of frequency subbands based on a plurality of listen-before-talk (LBTs) in the plurality of frequency subbands; and a processor configured to perform the plurality of LBTs in the plurality of frequency subbands by hopping from at least a first frequency subband of the plurality of frequency subbands to a second frequency subband of the plurality of frequency subbands based on the first BWP hopping pattern.

In some aspects, the BS may also include one or more of the following features. For instance, the BS includes where the processor configured to perform the plurality of LBTs is further configured to perform a first LBT of the plurality of LBTs, in the first frequency subband; and perform a second LBT of the plurality of LBTs, in the second frequency subband. The transceiver is further configured to transmit, to the UE in the first frequency subband, a BWP hopping activation; and the processor configured to perform the plurality of LBTs is further configured to perform the plurality of LBTs further based on the BWP hopping activation. The transceiver is further configured to transmit, to the UE, a BWP hopping deactivation; and the processor is further configured to perform a second LBT in the first frequency subband by hopping back to the first frequency subband based on the BWP hopping deactivation. The transceiver configured to transmit the BWP hopping activation is further configured to transmit, to a group of UEs including the UE in the first frequency subband, the BWP hopping activation. The transceiver is further configured to transmit, by the BS to the group of UEs, a BWP hopping deactivation. The configuration further indicates a second BWP hopping pattern in the plurality of frequency subbands different from the first BWP hopping pattern. The first BWP hopping pattern is associated with a first BWP that begins in the first frequency subband, and where the second BWP hopping pattern is associated with a second BWP that begins in a third frequency subband of the plurality of frequency subbands different from the first frequency subband. The transceiver is further configured to transmit, to the UE, a BWP hopping reconfiguration indicating to use the second BWP hopping pattern; and the processor is further configured to perform another plurality of LBTs in the plurality of frequency subbands based on the second BWP hopping pattern. The processor is further configured to switch from the second BWP hopping pattern to the first BWP hopping pattern based on a timer expiration. The configuration further indicates, for the first BWP hopping pattern, a first BWP hop duration in the first frequency subband and a second BWP hop duration in the second frequency subband. The processor is further configured to acquire a channel occupancy time (COT) in the first frequency subband, the COT including a period that is outside of the first BWP hop duration and at least partially within the second BWP hop duration; and the transceiver configured to communicate the one or more communication signals is further configured to communicate, with the UE, a first communication signal in the first frequency subband during the period that is at least partially within the second BWP hop duration. The transceiver is further configured to transmit, to the UE, a BWP hopping freeze instruction to remain in the first frequency subband after the first BWP hop duration; and the processor configured to perform the plurality of LBTs is further configured to perform a first LBT of the plurality of LBTs in the first frequency subband during the second BWP hop duration for the second frequency subband based on the BWP hopping freeze instruction. The transceiver is further configured to transmit, to the UE, a BWP hopping resume instruction; and the processor configured to perform the plurality of LBTs is further configured to perform a second LBT of the plurality of LBTs in the second frequency subband after hopping from the first frequency subband to the second frequency subband based on the BWP hopping resume instruction. The processor configured to perform the plurality of LBTs is further configured to perform a second LBT of the plurality of LBTs in the second frequency subband after hopping from the first frequency subband to the second frequency subband based on a timer expiration. The transceiver configured to transmit the BWP hopping freeze instruction is further configured to transmit, to a group of UEs including the UE, the BWP hopping freeze instruction. The transceiver is further configured to transmit, to the group of UEs, a BWP hopping resume instruction. The transceiver is further configured to transmit, to the UE, an instruction to hop from a third frequency subband of the plurality of frequency subbands to the first frequency subband before a start of the first BWP hop duration based on a channel detection in the third frequency subband. The transceiver configured to transmit the instruction to hop from the third frequency subband to the first frequency subband before the start of the first BWP hop duration is further configured to transmit, to a group of UEs including the UE, the instruction to hop from the third frequency subband to the first frequency subband before the start of the first BWP hop duration. The first BWP hopping pattern is based on a predetermined sequence. The first BWP hopping pattern is based on at least one of a transmission slot index, an identifier of the UE, a cell identifier, a starting BWP index, or a BWP hop dwell duration. The transceiver configured to communicate the one or more communication signals is further configured to transmit, to the UE in the first frequency subband, a first communication signal including data; and receive, from the UE in the second frequency subband, a second communication signal including an acknowledgement/negative-acknowledgement (ACK/NACK) for the data.

Further embodiments of the present disclosure include a non-transitory computer-readable medium having program code recorded thereon. The non-transitory computer-readable medium includes code for causing a user equipment (UE) to receive, from a base station (BS), a bandwidth part (BWP) configuration indicating a first BWP hopping pattern in a plurality of frequency subbands within a shared radio frequency band. The non-transitory computer-readable medium also includes code for causing the UE to monitor for a first communication signal in a first frequency subband of the plurality of frequency subbands. The non-transitory computer-readable medium also includes code for causing the UE to perform BWP hopping from the first frequency subband to a second frequency subband of the plurality of frequency subbands based on the first BWP hopping pattern. The non-transitory computer-readable medium also includes code for causing the UE to monitor, after performing the BWP hopping, for a second communication signal in the second frequency subband.

In some aspects, the non-transitory computer-readable medium may also include one or more of the following features. For instance, the non-transitory computer-readable medium may include code for causing the UE to perform a first listen-before-talk (LBT) in the first frequency subband; and code for causing the UE to perform a second LBT in the second frequency subband. The code for causing the UE to perform the BWP hopping is further configured to perform the BWP based on the BWP hopping activation. The non-transitory computer-readable medium may include code for causing the UE to receive, from the BS, a BWP hopping deactivation; code for causing the UE to perform, in response to the BWP hopping deactivation, BWP hopping back to the first frequency subband; and code for causing the UE to monitor for a third communication signal in the first frequency subband after performing the BWP hopping back to the first frequency subband. The configuration further indicates a second BWP hopping pattern in the plurality of frequency subbands different from the first BWP hopping pattern. The first BWP hopping pattern is associated with a first BWP that begins in the first frequency subband, and where the second BWP hopping pattern is associated with a second BWP that begins in a third frequency subband of the plurality of frequency subbands different from the first frequency subband. The non-transitory computer-readable medium may include code for causing the UE to receive, from the BS, a BWP hopping reconfiguration indicating to use the second BWP hopping pattern; and code for causing the UE to perform BWP hopping based on the second BWP hopping pattern. The non-transitory computer-readable medium may include code for causing the UE to switch from the second BWP hopping pattern to the first BWP hopping pattern based on a timer expiration. The configuration further indicates, for the first BWP hopping pattern, a first BWP hop duration in the first frequency subband and a second BWP hop duration in the second frequency subband. The code for causing the UE to perform the BWP hopping is further configured to delay the BWP hopping from the first frequency subband to the second frequency subband based on an end time of the COT. The non-transitory computer-readable medium may include code for causing the UE to receive, from the BS, a BWP hopping freeze instruction to remain in the first frequency subband after the first BWP hop duration; and code for causing the UE to refrain from performing BWP hopping after the first BWP hop duration based on the BWP hopping freeze instruction. The code for causing the UE to perform the BWP hopping is further configured to perform the BWP hopping from the first frequency subband to the second frequency subband further based on the BWP hopping resume instruction. Code for causing the UE to perform the BWP hopping is further configured to perform the BWP hopping from the first frequency subband to the second frequency subband further based on a timer expiration. The non-transitory computer-readable medium may include code for causing the UE to receive, from the BS, an instruction to hop from a third frequency subband of the plurality of frequency subbands to the first frequency subband before a start of the first BWP hop duration based on a channel detection in the third frequency subband. The first BWP hopping pattern is based on a predetermined sequence. The first BWP hopping pattern is based on at least one of a transmission slot index, an identifier of the UE, a cell identifier, a starting BWP index, or a BWP hop dwell duration. The non-transitory computer-readable medium may include code for causing the UE to receive, from the BS in the first frequency subband, the first communication signal including data based on the monitoring in the first frequency subband; and code for causing the UE to transmit, to the BS in the second frequency subband, an acknowledgement/negative-acknowledgement (ACK/NACK) for the data after performing the BWP hopping. Code for causing the UE to perform the BWP hopping is further configured to configure a frontend of the UE to switch from the first frequency subband to the second frequency subband.

Further embodiments of the present disclosure include a non-transitory computer-readable medium having program code recorded thereon. The non-transitory computer-readable medium includes code for causing a base station (BS) to transmit, to a user equipment (UE), a bandwidth part (BWP) configuration indicating a first BWP hopping pattern in a plurality of frequency subbands within a shared radio frequency band. The non-transitory computer-readable medium also includes code for causing the BS to perform a plurality of listen-before-talks (LBTs) in the plurality of frequency subbands by hopping from at least a first frequency subband of the plurality of frequency subbands to a second frequency subband of the plurality of frequency subbands based on the first BWP hopping pattern. The non-transitory computer-readable medium also includes code for causing the BS to communicate, with the UE, one or more communications signals in one or more frequency subbands of the plurality of frequency subbands based on the plurality of LBTs.

In some aspects, the non-transitory computer-readable medium may also include one or more of the following features. For instance, the non-transitory computer-readable medium includes where the code for causing the BS to perform the plurality of LBTs is further configured to perform a first LBT of the plurality of LBTs, in the first frequency subband; and perform a second LBT of the plurality of LBTs, in the second frequency subband. The code for causing the BS to perform the plurality of LBTs is further configured to perform the plurality of LBTs further based on the BWP hopping activation. The non-transitory computer-readable medium may include code for causing the BS to transmit, to the UE, a BWP hopping deactivation; and code for causing the BS to perform a second LBT in the first frequency subband by hopping back to the first frequency subband based on the BWP hopping deactivation. The code for causing the BS to transmit the BWP hopping activation is further configured to transmit, to a group of UEs including the UE in the first frequency subband, the BWP hopping activation. The non-transitory computer-readable medium may include code for causing the BS to transmit, by the non-transitory computer-readable medium to the group of UEs, a BWP hopping deactivation. The configuration further indicates a second BWP hopping pattern in the plurality of frequency subbands different from the first BWP hopping pattern. The first BWP hopping pattern is associated with a first BWP that begins in the first frequency subband, and where the second BWP hopping pattern is associated with a second BWP that begins in a third frequency subband of the plurality of frequency subbands different from the first frequency subband. The non-transitory computer-readable medium may include code for causing the BS to transmit, to the UE, a BWP hopping reconfiguration indicating to use the second BWP hopping pattern; and code for causing the BS to perform another plurality of LBTs in the plurality of frequency subbands based on the second BWP hopping pattern. The non-transitory computer-readable medium may include code for causing the BS to switch from the second BWP hopping pattern to the first BWP hopping pattern based on a timer expiration. The configuration further indicates, for the first BWP hopping pattern, a first BWP hop duration in the first frequency subband and a second BWP hop duration in the second frequency subband. The code for causing the BS to communicate the one or more communication signals is further configured to communicate, with the UE, a first communication signal in the first frequency subband during the period that is at least partially within the second BWP hop duration. The code for causing the BS to perform the plurality of LBTs is further configured to perform a first LBT of the plurality of LBTs in the first frequency subband during the second BWP hop duration for the second frequency subband based on the BWP hopping freeze instruction. The non-transitory computer-readable medium may include code for causing the BS to transmit, to the UE, a BWP hopping resume instruction, where the code for causing the BS to perform the plurality of LBTs is further configured to perform a second LBT of the plurality of LBTs in the second frequency subband after hopping from the first frequency subband to the second frequency subband based on the BWP hopping resume instruction. The code for causing the BS to perform the plurality of LBTs is further configured to perform a second LBT of the plurality of LBTs in the second frequency subband after hopping from the first frequency subband to the second frequency subband based on a timer expiration. The code for causing the BS to transmit the BWP hopping freeze instruction is further configured to transmit, to a group of UEs including the UE, the BWP hopping freeze instruction. The non-transitory computer-readable medium may include code for causing the BS to transmit, to the group of UEs, a BWP hopping resume instruction. The non-transitory computer-readable medium may include code for causing the BS to transmit, to the UE, an instruction to hop from a third frequency subband of the plurality of frequency subbands to the first frequency subband before a start of the first BWP hop duration based on a channel detection in the third frequency subband. The code for causing the BS to transmit the instruction to hop from the third frequency subband to the first frequency subband before the start of the first BWP hop duration is further configured to transmit, to a group of UEs including the UE, the instruction to hop from the third frequency subband to the first frequency subband before the start of the first BWP hop duration. The first BWP hopping pattern is based on a predetermined sequence. The first BWP hopping pattern is based on at least one of a transmission slot index, an identifier of the UE, a cell identifier, a starting BWP index, or a BWP hop dwell duration. The code for causing the BS to communicate the one or more communication signals is further configured to transmit, to the UE in the first frequency subband, a first communication signal including data; and receive, from the UE in the second frequency subband, a second communication signal including an acknowledgement/negative-acknowledgement (ACK/NACK) for the data.

Further embodiments of the present disclosure include a user equipment (UE) including means for receiving, from a base station (BS), a bandwidth part (BWP) configuration indicating a first BWP hopping pattern in a plurality of frequency subbands within a shared radio frequency band. The user equipment also includes means for monitoring for a first communication signal in a first frequency subband of the plurality of frequency subbands. The user equipment also includes means for performing BWP hopping from the first frequency subband to a second frequency subband of the plurality of frequency subbands based on the first BWP hopping pattern. The user equipment also includes means for monitoring, after performing the BWP hopping, for a second communication signal in the second frequency subband.

In some aspects, the UE may also include one or more of the following features. For instance, the UE may include means for performing a first listen-before-talk (LBT) in the first frequency subband; and means for performing a second LBT in the second frequency subband. The means for performing the BWP hopping is further configured to perform the BWP based on the BWP hopping activation. The UE may include means for receiving, from the BS, a BWP hopping deactivation; means for performing, in response to the BWP hopping deactivation, BWP hopping back to the first frequency subband; and means for monitoring for a third communication signal in the first frequency subband after performing the BWP hopping back to the first frequency subband. The configuration further indicates a second BWP hopping pattern in the plurality of frequency subbands different from the first BWP hopping pattern. The first BWP hopping pattern is associated with a first BWP that begins in the first frequency subband, and where the second BWP hopping pattern is associated with a second BWP that begins in a third frequency subband of the plurality of frequency subbands different from the first frequency subband. The UE may include means for receiving, from the BS, a BWP hopping reconfiguration indicating to use the second BWP hopping pattern; and means for performing BWP hopping based on the second BWP hopping pattern.

The UE may include means for switching from the second BWP hopping pattern to the first BWP hopping pattern based on a timer expiration. The configuration further indicates, for the first BWP hopping pattern, a first BWP hop duration in the first frequency subband and a second BWP hop duration in the second frequency subband. The means for performing the BWP hopping is further configured to delay the BWP hopping from the first frequency subband to the second frequency subband based on an end time of the COT. The UE may include means for receiving, from the BS, a BWP hopping freeze instruction to remain in the first frequency subband after the first BWP hop duration; and means for refraining from performing BWP hopping after the first BWP hop duration based on the BWP hopping freeze instruction. The means for performing the BWP hopping is further configured to perform the BWP hopping from the first frequency subband to the second frequency subband further based on the BWP hopping resume instruction. The means for performing the BWP hopping is further configured to perform the BWP hopping from the first frequency subband to the second frequency subband further based on a timer expiration. The UE may include means for receiving, from the BS, an instruction to hop from a third frequency subband of the plurality of frequency subbands to the first frequency subband before a start of the first BWP hop duration based on a channel detection in the third frequency subband. The first BWP hopping pattern is based on a predetermined sequence. The first BWP hopping pattern is based on at least one of a transmission slot index, an identifier of UE, a cell identifier, a starting BWP index, or a BWP hop dwell duration. The UE may include means for receiving, from the BS in the first frequency subband, the first communication signal including data based on the monitoring in the first frequency subband; and means for transmitting, to the BS in the second frequency subband, an acknowledgement/negative-acknowledgement (ACK/NACK) for the data after performing the BWP hopping. The means for performing the BWP hopping is further configured to configure a frontend of the UE to switch from the first frequency subband to the second frequency subband.

Further embodiments of the present disclosure include a base station (BS) including means for transmitting, to a user equipment (UE), a bandwidth part (BWP) configuration indicating a first BWP hopping pattern in a plurality of frequency subbands within a shared radio frequency band. The base station also includes means for performing a plurality of listen-before-talks (LBTs) in the plurality of frequency subbands by hopping from at least a first frequency subband of the plurality of frequency subbands to a second frequency subband of the plurality of frequency subbands based on the first BWP hopping pattern. The base station also includes means for communicating, with the UE, one or more communications signals in one or more frequency subbands of the plurality of frequency subbands based on the plurality of LBTs.

In some aspects, the BS may also include one or more of the following features. For instance, the BS includes where the means for performing the plurality of LBTs is further configured to perform a first LBT of the plurality of LBTs, in the first frequency subband; and perform a second LBT of the plurality of LBTs, in the second frequency subband. The means for performing the plurality of LBTs is further configured to perform the plurality of LBTs further based on the BWP hopping activation. The BS may include means for transmitting, to the UE, a BWP hopping deactivation; and means for performing a second LBT in the first frequency subband by hopping back to the first frequency subband based on the BWP hopping deactivation. The means for transmitting the BWP hopping activation is further configured to transmit, to a group of UEs including the UE in the first frequency subband, the BWP hopping activation. The BS may include means for transmitting, by the BS to the group of UEs, a BWP hopping deactivation. The configuration further indicates a second BWP hopping pattern in the plurality of frequency subbands different from the first BWP hopping pattern. The first BWP hopping pattern is associated with a first BWP that begins in the first frequency subband, and where the second BWP hopping pattern is associated with a second BWP that begins in a third frequency subband of the plurality of frequency subbands different from the first frequency subband. The BS may include means for transmitting, to the UE, a BWP hopping reconfiguration indicating to use the second BWP hopping pattern; and means for performing another plurality of LBTs in the plurality of frequency subbands based on the second BWP hopping pattern. The BS may include means for switching from the second BWP hopping pattern to the first BWP hopping pattern based on a timer expiration. The configuration further indicates, for the first BWP hopping pattern, a first BWP hop duration in the first frequency subband and a second BWP hop duration in the second frequency subband. The means for communicating the one or more communication signals is further configured to communicate, with the UE, a first communication signal in the first frequency subband during the period that is at least partially within the second BWP hop duration. The means for performing the plurality of LBTs is further configured to perform a first LBT of the plurality of LBTs in the first frequency subband during the second BWP hop duration for the second frequency subband based on the BWP hopping freeze instruction. The BS may include means for transmitting, to the UE, a BWP hopping resume instruction, where the means for performing the plurality of LBTs is further configured to perform a second LBT of the plurality of LBTs in the second frequency subband after hopping from the first frequency subband to the second frequency subband based on the BWP hopping resume instruction. The means for performing the plurality of LBTs is further configured to perform a second LBT of the plurality of LBTs in the second frequency subband after hopping from the first frequency subband to the second frequency subband based on a timer expiration. The means for transmitting the BWP hopping freeze instruction is further configured to transmit, to a group of UEs including the UE, the BWP hopping freeze instruction. The BS may include means for transmitting, to the group of UEs, a BWP hopping resume instruction. The BS may include means for transmitting, to the UE, an instruction to hop from a third frequency subband of the plurality of frequency subbands to the first frequency subband before a start of the first BWP hop duration based on a channel detection in the third frequency subband. The means for transmitting the instruction to hop from the third frequency subband to the first frequency subband before the start of the first BWP hop duration is further configured to transmit, to a group of UEs including the UE, the instruction to hop from the third frequency subband to the first frequency subband before the start of the first BWP hop duration. The first BWP hopping pattern is based on a predetermined sequence. The first BWP hopping pattern is based on at least one of a transmission slot index, an identifier of the UE, a cell identifier, a starting BWP index, or a BWP hop dwell duration. The means for communicating the one or more communication signals is further configured to transmit, to the UE in the first frequency subband, a first communication signal including data; and receive, from the UE in the second frequency subband, a second communication signal including an acknowledgement/negative-acknowledgement (ACK/NACK) for the data.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    receiving, by a user equipment (UE) from a base station (BS), a bandwidth part (BWP) configuration indicating a first BWP hopping pattern and a first BWP hop duration in a plurality of frequency subbands within a radio frequency band;
    monitoring, by the UE, for a first communication signal in a first frequency subband of the plurality of frequency subbands;
    performing, by the UE, BWP hopping from the first frequency subband to a second frequency subband of the plurality of frequency subbands based on the first BWP hopping pattern;
    monitoring, by the UE after performing the BWP hopping, for a second communication signal in the second frequency subband; and
    receiving, by the UE from the BS, a BWP hopping freeze instruction to remain in the second frequency subband after the first BWP hop duration.

2. The method of claim 1, further comprising:
    performing, by the UE, a first listen-before-talk (LBT) in the first frequency subband; and
    performing, by the UE, a second LBT in the second frequency subband.

3. The method of claim 1, further comprising:
    receiving, by the UE from the BS, a BWP hopping activation, wherein the performing the BWP hopping is further based on the BWP hopping activation.

4. The method of claim 3, further comprising:
    receiving, by the UE from the BS, a BWP hopping deactivation;
    performing, by the UE in response to the BWP hopping deactivation, BWP hopping back to the first frequency subband; and
    monitoring, by the UE, for a third communication signal in the first frequency subband after performing the BWP hopping back to the first frequency subband.

5. The method of claim 1, wherein the BWP configuration further indicates a second BWP hopping pattern in the plurality of frequency subbands different from the first BWP hopping pattern.

6. The method of claim 5, wherein the first BWP hopping pattern is associated with a first BWP that begins in the first frequency subband, and wherein the second BWP hopping pattern is associated with a second BWP that begins in a third frequency subband of the plurality of frequency subbands different from the first frequency subband.

7. The method of claim 5, further comprising:
    receiving, by the UE from the BS, a BWP hopping reconfiguration indicating to use the second BWP hopping pattern; and performing, by the UE, BWP hopping based on the second BWP hopping pattern.

8. The method of claim 1, wherein the BWP configuration further indicates, for the first BWP hopping pattern, a first BWP hop duration in the first frequency subband and a second BWP hop duration in the second frequency subband.

9. The method of claim 8, further comprising:
receiving, by the UE from the BS based on the monitoring in the first frequency subband, the first communication signal indicating a channel occupancy time (COT) in the first frequency subband acquired by the BS, the COT including a period that is outside of the first BWP hop duration and at least partially within the second BWP hop duration,
wherein the performing the BWP hopping includes:
delaying, by the UE, the BWP hopping from the first frequency subband to the second frequency subband based on an end time of the COT.

10. The method of claim 8, further comprising:
refraining, by the UE, from performing BWP hopping after the first BWP hop duration based on the BWP hopping freeze instruction.

11. The method of claim 10, further comprising:
receiving, by the UE from the BS, a BWP hopping resume instruction,
wherein the performing the BWP hopping from the first frequency subband to the second frequency subband is further based on the BWP hopping resume instruction.

12. The method of claim 8, further comprising:
receiving, by the UE from the BS, an instruction to hop from a third frequency subband of the plurality of frequency subbands to the first frequency subband before a start of the first BWP hop duration based on a channel detection in the third frequency subband.

13. The method of claim 1, wherein the first BWP hopping pattern is based on at least one of a predetermined sequence, a transmission slot index, an identifier of the UE, a cell identifier, a starting BWP index, or a BWP hop dwell duration.

14. The method of claim 1, further comprising:
receiving, by the UE from the BS in the first frequency subband, the first communication signal including data based on the monitoring in the first frequency subband; and
transmitting, by the UE to the BS in the second frequency subband, an acknowledgement/negative-acknowledgement (ACK/NACK) for the data after performing the BWP hopping.

15. A user equipment (UE), comprising:
a transceiver configured to:
receive, from a base station (BS), a bandwidth part (BWP) configuration indicating a first BWP hopping pattern and a first BWP hop duration in a plurality of frequency subbands within a radio frequency band; and
a processor configured to:
monitor for a first communication signal in a first frequency subband of the plurality of frequency subbands;
perform BWP hopping from the first frequency subband to a second frequency subband of the plurality of frequency subbands based on the first BWP hopping pattern;
monitor, after performing the BWP hopping, for a second communication signal in the second frequency subband; and
receive, by the UE from the BS, a BWP hopping freeze instruction to remain in the second frequency subband after the first BWP hop duration.

16. The UE of claim 15, wherein the processor is further configured to:
perform a first listen-before-talk (LBT) in the first frequency subband; and
perform a second LBT in the second frequency subband.

17. The UE of claim 15, wherein:
the transceiver is further configured to:
receive, from the BS, a BWP hopping activation; and
receive, from the BS after the BWP hopping activation, a BWP hopping deactivation;
the processor configured to perform the BWP hopping is further configured to:
perform the BWP hopping from the first frequency subband to the second frequency subband further based on the BWP hopping activation; and
the processor is further configured to:
perform, in response to the BWP hopping deactivation, BWP hopping back to the first frequency subband; and
monitor for a third communication signal in the first frequency subband after performing the BWP hopping back to the first frequency subband.

18. The UE of claim 15, wherein:
the first BWP hopping pattern is associated with a first BWP that begins in the first frequency subband;
the configuration further indicates a second BWP hopping pattern in the plurality of frequency subbands, the second BWP hopping pattern associated with a second BWP that begins in a third frequency subband of the plurality of frequency subbands different from the first frequency subband;
the transceiver is further configured to:
receive, from the BS, a BWP hopping reconfiguration indicating to use the second BWP hopping pattern; and
the processor is further configured to:
perform BWP hopping based on the second BWP hopping pattern.

19. The UE of claim 15, wherein:
the configuration further indicates, for the first BWP hopping pattern, a first BWP hop duration in the first frequency subband and a second BWP hop duration in the second frequency subband;
the transceiver is further configured to:
receive, from the BS based on the monitoring in the first frequency subband, the first communication signal indicating a channel occupancy time (COT) in the first frequency subband acquired by the BS, the COT including a period that is outside of the first BWP hop duration and at least partially within the second BWP hop duration; and
the processor configured to perform the BWP hopping is further configured to:
delay the BWP hopping from the first frequency subband to the second frequency subband based on an end time of the COT.

20. The UE of claim 15, wherein:
the configuration further indicates, for the first BWP hopping pattern, a first BWP hop duration in the first frequency subband and a second BWP hop duration in the second frequency subband;
the transceiver is further configured to:
receive, from the BS, the BWP hopping freeze instruction to remain in the first frequency subband after the first BWP hop duration; and
receive, from the BS after the BWP hopping freeze instruction, a BWP hopping resume instruction;

the processor is further configured to:
refrain from performing BWP hopping after the first BWP hop duration based on the BWP hopping freeze instruction; and
the processor configured to perform the BWP hopping is further configured to:
perform the BWP hopping from the first frequency subband to the second frequency subband further based on the BWP hopping resume instruction.

21. The UE of claim 15, wherein:
the configuration further indicates, for the first BWP hopping pattern, a first BWP hop duration in the first frequency subband and a second BWP hop duration in the second frequency subband; and
the transceiver is further configured to:
receive, from the BS, an instruction to hop from a third frequency subband of the plurality of frequency subbands to the first frequency subband before a start of the first BWP hop duration based on a channel detection in the third frequency subband.

22. The UE of claim 15, wherein the first BWP hopping pattern is based on at least one of a predetermined sequence, a transmission slot index, an identifier of the UE, a cell identifier, a starting BWP index, or a BWP hop dwell duration.

23. The UE of claim 15, wherein the transceiver is further configured to:
receive, from the BS in the first frequency subband, the first communication signal including data based on the monitoring in the first frequency subband; and
transmit, to the BS in the second frequency subband, an acknowledgement/negative-acknowledgement (ACK/NACK) for the data after performing the BWP hopping.

24. The UE of claim 15, further comprising:
a frontend,
wherein the processor configured to perform the BWP hopping is further configured to:
configure the frontend to switch from the first frequency subband to the second frequency subband.

25. A non-transitory computer-readable medium having program code recorded thereon, the program code comprising:
code for causing a user equipment (UE) to receive, from a base station (BS), a bandwidth part (BWP) configuration indicating a first BWP hopping pattern and a first BWP hop duration in a plurality of frequency subbands within a radio frequency band;
code for causing the UE to monitor for a first communication signal in a first frequency subband of the plurality of frequency subbands;
code for causing the UE to perform BWP hopping from the first frequency subband to a second frequency subband of the plurality of frequency subbands based on the first BWP hopping pattern;
code for causing the UE to monitor, after performing the BWP hopping, for a second communication signal in the second frequency subband; and
code for causing the UE to receive, by the UE from the BS, a BWP hopping freeze instruction to remain in the second frequency subband after the first BWP hop duration.

26. The non-transitory computer-readable medium of claim 25, further comprising:
code for causing the UE to receive, from the BS, a BWP hopping activation, wherein the code for causing the UE to perform the BWP hopping is further configured to perform the BWP hopping from the first frequency subband to the second frequency subband based on the BWP hopping activation;
code for causing the UE to receive, from the BS, a BWP hopping deactivation;
code for causing the UE to perform, in response to the BWP hopping deactivation, BWP hopping back to the first frequency subband; and
code for causing the UE to monitor for a third communication signal in the first frequency subband after performing the BWP hopping back to the first frequency subband.

27. The non-transitory computer-readable medium of claim 25, wherein:
the first BWP hopping pattern is associated with a first BWP that begins in the first frequency subband;
the BWP configuration further indicates a second BWP hopping pattern in the plurality of frequency subbands, the second BWP hopping pattern associated with a second BWP that begins in a third frequency subband of the plurality of frequency subbands different from the first frequency subband; and
the non-transitory computer-readable medium further comprises:
code for causing the UE to receive, from the BS, a BWP hopping reconfiguration indicating to use the second BWP hopping pattern; and
code for causing the UE to perform BWP hopping based on the second BWP hopping pattern.

28. The non-transitory computer-readable medium of claim 25, wherein:
the BWP configuration further indicates, for the first BWP hopping pattern, a first BWP hop duration in the first frequency subband and a second BWP hop duration in the second frequency subband;
the non-transitory computer-readable medium further comprises:
code for causing the UE to receive, from the BS, the BWP hopping freeze instruction to remain in the first frequency subband after the first BWP hop duration; and
code for causing the UE to refrain from performing BWP hopping after the first BWP hop duration based on the BWP hopping freeze instruction;
code for causing the UE to receive, from the BS, a BWP hopping resume instruction; and
the code for causing the UE to perform the BWP hopping is further configured to:
perform the BWP hopping from the first frequency subband to the second frequency subband further based on the BWP hopping resume instruction.

29. The non-transitory computer-readable medium of claim 25,
the BWP configuration further indicates, for the first BWP hopping pattern, a first BWP hop duration in the first frequency subband and a second BWP hop duration in the second frequency subband; and
the non-transitory computer-readable medium further comprises:
code for causing the UE to receive, from the BS, an instruction to hop from a third frequency subband of the plurality of frequency subbands to the first frequency subband before a start of the first BWP hop duration based on a channel detection in the third frequency subband.

30. The non-transitory computer-readable medium of claim 25, wherein the first BWP hopping pattern is based on at least one of a predetermined sequence, a transmission slot index, an identifier of the UE, a cell identifier, a starting BWP index, or a BWP hop dwell duration.

* * * * *